US009448500B2

(12) United States Patent
Harada et al.

(10) Patent No.: US 9,448,500 B2
(45) Date of Patent: Sep. 20, 2016

(54) MAGNETIC IRON OXIDE PARTICLES, MAGNETIC CARRIER FOR ELECTROPHOTOGRAPHIC DEVELOPERS AND PROCESS FOR PRODUCING THE SAME, AND TWO-COMPONENT SYSTEM DEVELOPER

(75) Inventors: Shigenori Harada, Hiroshima-ken (JP); Shinji Uemoto, Hiroshima-ken (JP); Hiromitsu Misawa, Hiroshima-ken (JP); Eiichi Kurita, Hiroshima-ken (JP); Koso Aoki, Hiroshima-ken (JP)

(73) Assignee: TODA KOGYO CORPORATION, Hiroshima (JP)

( * ) Notice: Subject to any disclaimer, the term of this patent is extended or adjusted under 35 U.S.C. 154(b) by 0 days.

(21) Appl. No.: 14/008,323

(22) PCT Filed: Mar. 29, 2012

(86) PCT No.: PCT/JP2012/058351
§ 371 (c)(1),
(2), (4) Date: Oct. 23, 2013

(87) PCT Pub. No.: WO2012/133645
PCT Pub. Date: Oct. 4, 2012

(65) Prior Publication Data
US 2014/0051020 A1 Feb. 20, 2014

(30) Foreign Application Priority Data
Mar. 31, 2011 (JP) .................................. 2011-078185

(51) Int. Cl.
| | | |
|---|---|---|
| *G03G 9/083* | (2006.01) | |
| *C09C 1/24* | (2006.01) | |
| *G03G 9/107* | (2006.01) | |
| *G03G 9/113* | (2006.01) | |

(52) U.S. Cl.
CPC ............... *G03G 9/0839* (2013.01); *C09C 1/24* (2013.01); *G03G 9/107* (2013.01); *G03G 9/113* (2013.01);
(Continued)

(58) Field of Classification Search
CPC .... G03G 9/00; G03G 9/0838; G03G 9/0839; G03G 9/107; G03G 9/1134; G03G 9/1135; Y10T 428/2982; C01P 2006/42; C01P 2004/51; C01P 2004/62; C01P 2004/04; C01P 2006/12; C01P 2006/62; C01P 2004/45; C09C 1/24
USPC .................... 430/111.31, 111.35, 106.1
See application file for complete search history.

(56) References Cited

U.S. PATENT DOCUMENTS

| | | | | |
|---|---|---|---|---|
| 5,198,138 | A * | 3/1993 | Yamamoto et al. | ....... 252/62.54 |
| 5,654,120 | A * | 8/1997 | Hakata | ..................... G03G 9/10 |
| | | | | 430/111.32 |

(Continued)

FOREIGN PATENT DOCUMENTS

| | | |
|---|---|---|
| JP | 2000-039742 | 2/2000 |
| JP | 2003-192351 | 7/2003 |

(Continued)

OTHER PUBLICATIONS

International Search Report for PCT/JP2012/058351 mailed Jun. 5, 2012.

(Continued)

*Primary Examiner* — Thorl Chea
(74) *Attorney, Agent, or Firm* — Nixon & Vanderhye P.C.

(57) ABSTRACT

The present invention provides magnetic iron oxide particles having a high bonding property to a resin as well as a magnetic carrier for electrophotographic developers which is improved in durability by enhancing adhesion between a magnetic carrier core material and a coating resin. The magnetic iron oxide particles of the present invention are magnetic iron oxide particles having an average particle diameter of 0.5 to 30 μm onto which a plurality of granules are bonded, and the magnetic carrier for electrophotographic developers according to the present invention is a magnetic carrier for electrophotographic developers which comprises spherical magnetic composite particles produced by dispersing magnetic iron oxide particles in a binder resin in which the magnetic iron oxide particles comprise at least the above magnetic iron oxide particles having an average particle diameter of 0.5 to 30 μm onto which the plurality of granules are bonded.

10 Claims, 6 Drawing Sheets

(52) U.S. Cl.
CPC ........... *G03G 9/1134* (2013.01); *G03G 9/1135* (2013.01); *G03G 9/1136* (2013.01); *C01P 2004/04* (2013.01); *C01P 2004/45* (2013.01); *C01P 2004/51* (2013.01); *C01P 2004/62* (2013.01); *C01P 2006/12* (2013.01); *C01P 2006/42* (2013.01); *C01P 2006/62* (2013.01); *Y10T 428/2982* (2015.01)

(56) References Cited

U.S. PATENT DOCUMENTS 7,144,626 B2 * 12/2006 Akai ................. H01F 1/344
 252/62.56

2009/0311617 A1 * 12/2009 Uemoto et al. ............ 430/106.1
2012/0129087 A1 5/2012 Iwami et al.

FOREIGN PATENT DOCUMENTS

| | | |
|---|---|---|
| JP | 2009-230090 | 10/2009 |
| JP | 2011-013676 | 1/2011 |

OTHER PUBLICATIONS

Extended European Search Report in EP 12 76 5876 dated Sep. 1, 2014.

* cited by examiner

2 μm 1.00μm

MAGNETIC IRON OXIDE PARTICLES, MAGNETIC CARRIER FOR ELECTROPHOTOGRAPHIC DEVELOPERS AND PROCESS FOR PRODUCING THE SAME, AND TWO-COMPONENT SYSTEM DEVELOPER

This application is the U.S. national phase of International Application No. PCT/JP2012/058351 filed 29 Mar. 2012 which designated the U.S. and claims priority to JP 2011-078185 filed 31 Mar. 2011, the entire contents of each of which are hereby incorporated by reference.

TECHNICAL FIELD

The present invention provides magnetic iron oxide particles which can be used as a brake friction material, a magnetic material for an electrophotographic carrier or the like and further as a black coloring pigment for paints, resins, cosmetics, printing inks or the like because of an excellent blackness thereof. Also, the present invention relates to a magnetic carrier for electrophotographic developers, and more particularly, to a magnetic carrier for electrophotographic developers which is provided on a surface thereof with fine irregularities owing to a plurality of granules attached thereto to exhibit an excellent adhesion property to a resin when coated with the resin and therefore maintain an electrical resistance value against a mechanical stress exerted on the resin-coated carrier, and further can maintain a high-quality image for a long period of time and exhibit an excellent durability.

BACKGROUND ART

Magnetite particles as one kind of magnetic iron oxide particles are a typical black pigment, and have been long-time used as a colorant for paints, printing inks, cosmetics, rubbers and resin compositions, or the like. Also, the magnetite particles have been used as a friction material such as a disk brake pad, a brake lining, etc., for braking automobiles, rail road vehicles or various industrial equipments, and further used as magnetic iron oxide particles for a resin carrier in an electrophotographic developer because of a high magnetization value thereof.

In particular, in the case where the magnetic iron oxide particles are used for a resin carrier in an electrophotographic developer, there tends to arise such a problem that the magnetic iron oxide particles are fallen off from a surface of the carrier upon development and scattered around, which tends to result in deteriorated developability of the electrophotographic developer. For this reason, it has been required that the magnetic iron oxide particles are prevented from being fallen off from the surface of the carrier.

Therefore, in order to satisfy the above requirements for the resin carrier, it has been strongly required that the magnetic iron oxide particles are enhanced in bonding property to a resin.

In order to enhance a bonding property between the magnetic iron oxide particles and a resin, it has been attempted to use those magnetic iron oxide particles having protrusions or those magnetic iron oxide particles subjected to a lipophilic treatment.

For example, in Patent Document 1, there are described the magnetic iron oxide particles each including a base particle portion having a spherical shape and angular protrusions formed on a surface thereof.

Also, in Patent Document 2, there are described the magnetic metal compound particles whose surface is subjected to a lipophilic treatment.

In addition, in Patent Document 3, there are described the magnetic iron oxide particles whose aggregated particles are well controlled in particle diameter.

As is well known in the art, in electrophotographic methods, there has been in general employed the following developing method. That is, a photosensitive member formed of a photoconductive material such as selenium, OPC (organic photoconductor), a-Si or the like is used to form an electrostatic latent image thereon by various means. Then, by using a magnetic brush developing method or the like, a toner electrically charged into a polarity reverse to that of the latent image is attached thereonto by the electrostatic force to develop the latent image.

In the above developing step, there is used a two-component system developer comprising a toner and a carrier. The carrying particles called a magnetic carrier act for imparting an appropriate positive or negative electric charge amount to the toner by frictional electrification, and delivering the toner into a developing zone near the surface of the photosensitive member on which the latent image is formed, through a developing sleeve in which magnets are accommodated, using a magnetic force thereof.

The above electrophotography has been extensively applied to copying machines or printers. In recent years, these apparatuses have been rapidly functionalized, i.e., digitalized and formed into a composite structure and, at the same time, have been required to have a high image quality and a high copying or printing speed. With these requirements, there is an increasing demand for developers used therein which are improved in various properties.

In particular, with the increase in image quality and copying or printing speed of these electrophotographic apparatuses, it has been demanded that a carrier used in a developer for developing color images further has a high reliability. Thus, it is required that the carrier used in the developer has a long service life such that various properties of the carrier such as an electric resistance thereof can be stably maintained over a long period of time.

In a developing device, the carrier is always subjected to repeated frictional contact with a toner, other carrier particles or an inside portion of the developing device, and therefore suffers from a shear force. As a result, there tend to be caused problems such as change in electric resistance value of the resin-coated carrier and formation of spent toner.

The iron powder carrier and ferrite carrier are usually used in the form of resin-coated particles obtained by coating a surface thereof with a resin. However, since the iron powder carrier has a true specific gravity as large as 7 to 8 g/cm$^3$ whereas the ferrite carrier has a true specific gravity as large as 4.5 to 5.5 g/cm$^3$, a large driving force is required for stirring these carriers in the developing device, resulting in significant mechanical damage to the device, occurrence of spent toner as well as change in electric resistance of the carrier itself and facilitated damage to the photosensitive member.

The carrier of a magnetic material-dispersed type comprising spherical composite particles formed from magnetic fine particles and a phenol resin as described in Japanese Patent Application Laid-Open (KOKAI) No. 2-220068 has a true specific gravity as small as 3 to 4 g/cm$^3$ as compared to the iron powder carrier or ferrite carrier, so that the energy upon impingement between the carrier and the toner becomes small. Therefore, it is advantageous to attain a durable retention property of an electric resistance value of the resin-coated carrier and suppress formation of spent toner.

However, with the increase in functionality, image quality and copying or printing speed of recent copying machines or printers, there tends to arise such a problem that when a shear force is applied onto the carrier in the developing device, the carrier suffers from change in electric resistance value to cause deterioration in image quality, adhesion between the carrier particles or the like.

In particular, in recent years, with the progress of maintenance-free systems, a developer used therein is often required to have a durability over a long period of time which may correspond to almost a whole service life of the maintenance-free machines. Therefore, it is strongly required to provide a carrier having an excellent durability.

Conventionally, with respect to the magnetic material-dispersed type carrier for electrophotographic developers, there are known the techniques which have noticed surface conditions of particles, e.g., the technique of forming fine irregularities owing to plate-shaped metal oxide particles being present on a surface of respective spherical composite particles to control surface conditions of a magnetic carrier according to a fluidity rate and an average particle diameter thereof (Patent Document 5); the technique of forming fine irregularities on a surface of respective particles obtained by dispersing ferromagnetic iron oxide particles in a phenol resin to control surface conditions of a magnetic carrier according to a ten-point mean roughness thereof (Patent Document 6); or the like. Also, as the techniques which have noticed aggregating conditions of particles, there are known the technique concerning magnetic iron oxide particles which are controlled in particle diameter of aggregated particles thereof (Patent Document 3) and the like.

CITATION LIST

Patent Literatures

Patent Document 1: Japanese Patent Application Laid-Open (KOKAI) No. 2009-167032
Patent Document 2: Japanese Patent Application Laid-Open (KOKAI) No. 2009-230090
Patent Document 3: Japanese Patent Application Laid-Open (KOKAI) No. 8-259238
Patent Document 4: Japanese Patent Application Laid-Open (KOKAI) No. 2003-192351
Patent Document 5: Japanese Patent Application Laid-Open (KOKAI) No. 2003-323007
Patent Document 6: Japanese Patent Application Laid-Open (KOKAI) No. 2011-13676

SUMMARY OF THE INVENTION

Problems to be Solved by the Invention

It has been strongly required to provide magnetic iron oxide particles having a high bonding property to a resin. However, such magnetic iron oxide particles have not been obtained until now.

That is, the conventional art described in Patent Document 1 is the technique which has noticed a shape of particles. However, as described in the below-mentioned Comparative Example 1-3, the resulting particles tend to be still insufficient in bonding property to a resin.

The conventional art described in Patent Document 2 is the technique of enhancing adhesion of particles to a resin by subjecting the particles to a lipophilic treatment. However, the resulting particles tend to be insufficiently improved in bonding property to a resin only by the lipophilic treatment.

The conventional arts described in Patent Documents 3 and 4 are the techniques which have noticed aggregating conditions of particles, and therefore are different from the present invention. As described in the below-mentioned Comparative Examples 1-4 and 1-5, the resulting particles tend to be still insufficient in bonding property to a resin.

The conventional arts described in Patent Documents 5 and 6 are the techniques in which fine irregularities are formed on a surface of respective magnetic carrier particles to enhance a bonding property to a coating resin. However, the resin coating layer hardly exhibits a sufficient durability against a shear force exerted onto the magnetic carrier in a developing device, and therefore the resulting carrier may fail to fulfill the requirement concerning a long-service life thereof.

Also, in the conventional art described in Patent Document 3, in the case where the aggregated particles are used as magnetic iron oxide particles for spherical magnetic composite particles, the resulting spherical magnetic composite particles tend to have a smooth surface and therefore may fail to fulfill the task of obtaining a magnetic carrier having a good durability.

In consequence, an object or technical task 1 of the present invention is to provide magnetic iron oxide particles having a high bonding property to a resin.

Also, an object or technical task 2 of the present invention is to provide a magnetic carrier for electrophotographic developers which is improved in durability by enhancing a bonding property between a magnetic carrier core material and a coating resin.

Means for Solving the Problems

The object or technical task 1 of the present invention can be achieved by the following Inventions.

That is, according to the present invention, there are provided magnetic iron oxide particles comprising a plurality of granules bonded thereto, the magnetic iron oxide particles having an average particle diameter of 0.5 to 30 μm (Invention 1).

Also, according to the present invention, there are provided the magnetic iron oxide particles as described in the above Invention 1, wherein the magnetic iron oxide particles have a specific surface area Sv (m$^2$/g) capable of satisfying the relation represented by the following formula:

$Sv \geq 2/X$ wherein X is an average particle diameter (μm) of the magnetic iron oxide particles (Invention 2).

Also, according to the present invention, there are provided the magnetic iron oxide particles as described in the above Invention 1 or 2, wherein the magnetic iron oxide particles have a vehicle color L* value of not less than 60 (Invention 3).

Further, the object or technical task 2 of the present invention can be achieved by the following Inventions.

According to the present invention, there is provided a magnetic carrier for electrophotographic developers comprising spherical magnetic composite particles produced by dispersing magnetic iron oxide particles in a binder resin, said magnetic iron oxide particles comprising at least the magnetic iron oxide particles as described in any one of the above Inventions 1 to 3 (Invention 4).

Also, according to the present invention, there is provided the magnetic carrier for electrophotographic developers as described in the above Invention 4, wherein a mixing ratio between magnetic iron oxide particles (a) onto which the plurality of granules are bonded and magnetic iron oxide particles (b) onto which the plurality of granules are not bonded is controlled such that the magnetic iron oxide particles (a) are contained in an amount of 5 to 95% by weight based on 100% by weight as a total weight of the magnetic iron oxide particles in the magnetic carrier (Invention 5).

Also, according to the present invention, there is provided the magnetic carrier for electrophotographic developers as described in the above Invention 4 or 5, wherein the binder resin is a phenol-based resin (Invention 6).

Also, according to the present invention, there is provided the magnetic carrier for electrophotographic developers as described in any one of the above Inventions 4 to 6, wherein a surface of the respective spherical magnetic composite particles is coated with a coating layer comprising a melamine resin (Invention 7).

Also, according to the present invention, there is provided the magnetic carrier for electrophotographic developers as described in any one of the above Inventions 4 to 7, wherein a surface of the respective spherical magnetic composite particles is coated with a resin, and the coating resin is at least one resin selected from the group consisting of a silicone-based resin, a fluorine-based resin, an acrylic resin and a styrene-acrylic resin (Invention 8).

In addition, according to the present invention, there is provided a two-component system developer comprising the magnetic carrier for electrophotographic developers as described in any one of the above Inventions 4 to 8 and a toner (Invention 9).

Effect of the Invention

When the magnetic iron oxide particles having a high bonding property to a resin according to the present invention are used especially for a resin carrier, it is possible to suitably suppress falling-off of the magnetic iron oxide particles from the resin.

Also, in the magnetic carrier for electrophotographic developers according to the present invention which comprise spherical magnetic composite particles produced by dispersing magnetic iron oxide particles in a bonder resin, when using at least magnetic iron oxide particles having an average particle diameter of 0.5 to 30 μm onto which a plurality of granules are bonded, as the above magnetic iron oxide particles, fine irregularities are formed on the surface of the magnetic carrier. As a result, the resulting magnetic carrier has a very excellent bonding property to a coating resin, and is capable of maintaining an electric resistance for a long period of time and exhibiting an excellent durability, and therefore can be suitably used as a magnetic carrier for electrophotographic developers.

PREFERRED EMBODIMENTS FOR CARRYING OUT THE INVENTION

Figure 1:
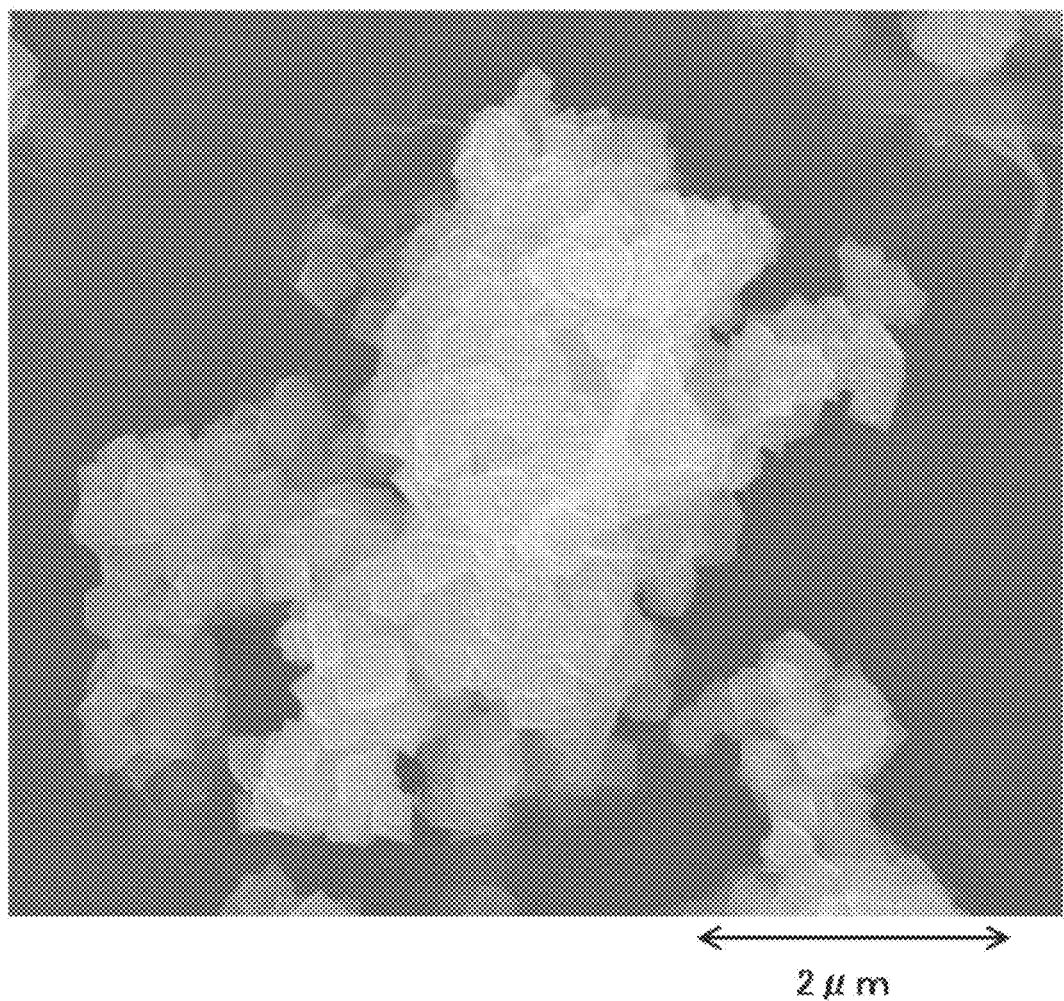
FIG. 1 is an electron micrograph showing the magnetic iron oxide particles obtained in Example 1-1 (magnification: ×10000 times).

The present invention is described in detail below. First, the magnetic iron oxide particles according to the Inventions 1 to 3 are described.

The magnetic iron oxide particles according to the present invention have a composition of magnetite particles ($(FeO)_x \cdot Fe_2O_3$; $0<x\leq1$), and may comprise at least one metal element other than iron selected from the group consisting of Mn, Zn, Ni, Cu, Ti, Si, Al, Mg and Ca in a total amount of 0 to 20% by weight based on the weight of the magnetic iron oxide particles.

The magnetic iron oxide particles according to the present invention have such a particle shape that a plurality of granules are bonded (connected) thereto. Examples of the shape of the granules bonded include an octahedral shape, a hexahedral shape, a polyhedral shape and a spherical shape.

The magnetic iron oxide particles according to the present invention have an average particle diameter (primary particle diameter) of 0.5 to 30 μm. When the average particle diameter of the magnetic iron oxide particles is less than 0.5 μm, the magnetic iron oxide particles tend to be undesirably insufficient in bonding property to a resin. When the average particle diameter of the magnetic iron oxide particles is more than 30 μm, it may be difficult to use the magnetic iron oxide particles for a resin carrier. The average particle diameter of the magnetic iron oxide particles is preferably 1.0 to 20 μm.

The magnetic iron oxide particles according to the present invention comprise a plurality of granules bonded thereto, and it is not possible to readily separate the thus bonded granules therefrom. In the present invention, since the granules cannot be separated from the magnetic iron oxide particles, it may be difficult to measure a particle size of the granules. However, the particle size of the granules is preferably 0.02 to 2.0 μm and more preferably 0.05 to 1.5 μm.

The magnetic iron oxide particles according to the present invention preferably have a BET specific surface area Sv ($m^2/g$) capable of satisfying the relation represented by the following formula:

$Sv \geq 2/X$ wherein X is an average particle diameter (μm) of the magnetic iron oxide particles. The relation satisfied by the magnetic iron oxide particles according to the present invention is one of features showing such a structure of the magnetic iron oxide particles that the plurality of granules are bonded thereto. In the case where the BET specific surface area Sv is less than $2/X$ ($Sv<2/X$), the magnetic iron oxide particles tend to be insufficient in bonding property to a resin. Specifically, the BET specific surface area of the magnetic iron oxide particles according to the present invention is preferably not less than 0.1 $m^2/g$. When the BET specific surface area of the magnetic iron oxide particles is less than 0.1 $m^2/g$, the magnetic iron oxide particles tend to be undesirably insufficient in bonding property to a resin. The upper limit of the BET specific surface area of the magnetic iron oxide particles according to the present invention is about 100 m²/g in view of a good productivity.

The magnetic iron oxide particles according to the present invention preferably have a vehicle color L* value of not less than 60. When the vehicle color L* value of the magnetic iron oxide particles is less than 60, the magnetic iron oxide particles tend to be undesirably insufficient in bonding property to a resin. The upper limit of the vehicle color L* value of the magnetic iron oxide particles according to the present invention is about 80 because of a good productivity, or the like.

The magnetic iron oxide particles according to the present invention preferably have a saturation magnetization value of 60 to 92 Am²/kg (60 to 92 emu/g) and more preferably 65 to 91 Am²/kg (65 to 91 emu/g). The saturation magnetization value of 92 Am²/kg is a theoretical value of the saturation magnetization of magnetite, and therefore it is not possible for the magnetic iron oxide particles according to the present invention to exceed this value. When saturation magnetization value of the magnetic iron oxide particles is less than 60 Am²/kg, the amount of $Fe^{2+}$ in the particles tends to be reduced, so that the resulting magnetic iron oxide particles tend to exhibit a reddish color and therefore tend to be unsuitable as a black color pigment.

Next, the process for producing the magnetic iron oxide particles according to the present invention is described.

The magnetic iron oxide particles according to the present invention can be produced by the following method. That is, an aqueous $Fe^{2+}$ solution and an aqueous alkali solution are added to a reactor, and while maintaining the reaction system at a predetermined temperature, the obtained reaction solution is subjected to mechanical stirring and further to oxidation reaction, and further after completion of the reaction, the obtained reaction solution is subjected to filtration, washing with water, drying and pulverization.

As the aqueous $Fe^{2+}$ solution employed in the above reaction conducted in the process of the present invention, there may be used, for example, an aqueous solution of an ordinary iron compound such as ferrous sulfate and ferrous chloride. In addition, as the alkali solution, there may be used an aqueous solution of an alkali such as sodium hydroxide and sodium carbonate. The respective raw materials may be appropriately selected in view of economy or reaction efficiency.

In the reaction conducted in the process of the present invention, the concentration of iron reacted is 1.2 to 2.0 mol/L. When the concentration of iron is less than 1.2 mol/L, it may be difficult to obtain particles having a shape and a particle diameter as aimed. When the concentration of iron reacted is more than 2.0 mol/L, the resulting reaction solution tends to have an excessively high viscosity, so that it may be difficult to industrially produce the aimed particles.

The aqueous alkali solution is used in an amount of 1.0 to 3.0 equivalent and preferably 1.0 to 2.5 equivalent based on $Fe^{2+}$ in the aqueous ferrous salt solution. When the amount of the aqueous alkali solution used is less than 1.0 equivalent, the unreacted ferrous salt tends to remain in the reaction solution, so that it may be difficult to produce the aimed magnetite particles in the form of a single phase. When the amount of the aqueous alkali solution used is more than 3.0 equivalent, the resulting reaction solution tends to exhibit an excessively high viscosity, so that it may be difficult to industrially produce the aimed magnetite particles.

In the reaction conducted in the process of the present invention, the reaction temperature is 85 to 100° C. When the reaction temperature is lower than 85° C., goethite particles tend to be included in the aimed magnetic particles. When the reaction temperature is higher than 100° C., although the aimed magnetic iron oxide particles are obtained, such a reaction tends to be unpractical from the industrial viewpoints because a special apparatus such as an autoclave is required.

In the present invention, the reaction solution is preferably stirred by a mechanical method. The stirring speed is preferably not more than 7 rpm. When the stirring speed of the reaction solution is more than 7 rpm, it may be difficult to obtain particles having the aimed shape. The lower limit of the stirring speed of the reaction solution is not particularly limited as long as the reaction solution can be suitably mixed, and is about 1 rpm.

In the present invention, the oxidizing means used in the oxidation reaction is preferably oxygen. When using oxygen in the oxidation reaction, it is possible to suitably perform the oxidation reaction even when the amount of an oxidizing gas flowing through the reaction system is small, so that the need of excessively stirring the reaction solution can be suppressed. The oxygen is preferably fed to the reaction solution at the position not lower than a half of height of the reaction solution. When the oxygen is fed to the reaction solution at the position lower than a half of height of the reaction solution, the reaction solution tends to be excessively stirred to a more than necessary extent, so that it may be difficult to obtain the aimed particles.

In order that the magnetic iron oxide particles have such a structure that a plurality of granules are bonded thereto, it is important, in particular, that the stirring speed of the reaction solution is controlled to the value much lower than ordinarily, i.e., not more than 7 rpm, and oxygen as the oxidizing means is fed to the reaction solution at the position not lower than a half of height of the reaction solution. When satisfying the above requirements, it is possible to accelerate formation of such a structure in which the plurality of granules are bonded to the respective magnetic iron oxide particles.

As generally known, upon the reaction, a salt of at least one element selected from the group consisting of Mn, Zn, Ni, Cu, Ti, Si, Al, Mg and Ca may be added to the reaction system. The salt of the element is preferably added in an amount of 0 to 20.0% by weight based on the weight of the magnetic iron oxide particles.

The magnetic iron oxide particles may be subjected to surface treatment with a compound comprising at least one element selected from the group consisting of Mn, Zn, Ni, Cu, Ti, Si, Al, Mg and Ca. The compound comprising the above element is preferably added in an amount of 0 to 20.0% by weight based on the weight of the magnetic iron oxide particles.

The magnetic iron oxide particles may comprise an element(s) such as Mn, Zn, Ni, Cu, Ti, Si, Al, Mg, Ca, S, Na, K, P and Cl which may be derived from the iron raw material and alkali raw material. These elements are preferably contained in a total amount of not more than 2.0% by weight based on the weight of the magnetic iron oxide particles.

After completion of the reaction, the resulting reaction solution may be subjected to washing with water, drying and pulverization by ordinary methods.

Next, the magnetic carrier for electrophotographic developers according to the Inventions 6 to 11 is explained. The magnetic carrier for electrophotographic developers according to the present invention is a magnetic carrier for electrophotographic developers comprising spherical magnetic composite particles obtained by dispersing magnetic iron oxide particles in a binder resin in which the magnetic iron oxide particles comprise at least the magnetic iron oxide particles onto which a plurality of granules are bonded as described in the Inventions 1 to 3.

The magnetic iron oxide particles onto which the plurality of granules are bonded according to the present invention are the same as described previously.

Next, the magnetic carrier for electrophotographic developers according to the present invention (hereinafter referred to merely as a "magnetic carrier") is described.

The electric resistance value of the magnetic carrier according to the present invention when applying a voltage of 100 V thereto is preferably $1.0 \times 10^6$ Ω·cm to $1.0 \times 10^{16}$ Ω·cm, more preferably $5.0 \times 10^6$ Ω·cm to $1.0 \times 10^{15}$ Ω·cm and still more preferably $1.0 \times 10^7$ Ω·cm to $1.0 \times 10^{14}$ Ω·cm. When the electric resistance value of the magnetic carrier when applying a voltage of 100 V thereto is less than $1 \times 10^6$ Ω·cm, there tends to undesirably arise such a problem that the magnetic carrier is attached onto an image forming portion of a sleeve of a photosensitive member owing to electric charge injected from the sleeve, or a latent image charge is escaped through the magnetic carrier, resulting in occurrence of poor latent images and lack of the images. When the electric resistance value of the magnetic carrier when applying a voltage of 100 V thereto is more than $1.0 \times 10^{16}$ Ω·cm, the edge effect of solid images tends to occur, so that solid image portions tend to be hardly reproduced.

The magnetic carrier according to the present invention preferably has an average particle diameter of 10 to 100 μm. When the average particle diameter of the magnetic carrier is less than 10 μm, the magnetic carrier tends to suffer from secondary aggregation. When the average particle diameter of the magnetic carrier is more than 100 μm, the magnetic carrier tends to have a low mechanical strength, so that it may be difficult to obtain clear images. The average particle diameter of the magnetic carrier according to the present invention is more preferably 20 to 70 μm.

The magnetic carrier according to the present invention preferably has a bulk density of not more than 2.5 g/cm$^3$ and more preferably 1.0 to 2.0 g/cm$^3$. The specific gravity of the magnetic carrier according to the present invention is preferably 2.5 to 4.5 and more preferably 3.0 to 4.0.

The magnetic carrier according to the present invention preferably has a saturation magnetization value of 20 to 100 Am$^2$/kg (20 to 100 emu/g) and more preferably 40 to 90 Am$^2$/kg (40 to 90 emu/g).

Next, the process for producing the magnetic carrier for electrophotographic developers according to the present invention is described.

The magnetic iron oxide particles contained in the magnetic carrier for electrophotographic developers according to the present invention may also comprise one or more kinds of magnetic iron oxide particles onto which a plurality of granules are not bonded in combination with the magnetic iron oxide particles onto which the plurality of granules are bonded. The shape of the thus combined magnetic iron oxide particles onto which the plurality of granules are not bonded may be any shape selected from the group consisting of an octahedral shape, a hexahedral shape, a polyhedral shape, a spherical shape, a plate shape, an acicular shape and an amorphous shape. In this case, the granule-bonded and granule-non-bonded magnetic iron oxide particles which are combined with each other may have either the same shape or a different shape. The average particle diameter (primary particle diameter) of the thus combined granule-non-bonded magnetic iron oxide particles is preferably 0.02 to 5 μm. When the average particle diameter of the thus combined granule-non-bonded magnetic iron oxide particles is less than 0.02 μm, the cohesive force between the magnetic iron oxide particles tends to be excessively large, so that it may be difficult to produce the aimed magnetic composite particles.

The magnetic iron oxide particles contained in the magnetic carrier for electrophotographic developers according to the present invention may comprise one kind of magnetic iron oxide particles solely or may comprise two or more kinds of magnetic iron oxide particles in combination with each other. Further, different kinds of magnetic iron oxide particles onto which two or more kinds of the plurality of granules that are different in particle diameter from each other are respectively bonded may be used in combination with each other.

The magnetic iron oxide particles contained in the magnetic carrier for electrophotographic developers according to the present invention may comprise one or more kinds of magnetic iron oxide particles in combination with each other. When the magnetic iron oxide particles (a) onto which the plurality of granules are bonded are used in combination with the magnetic iron oxide particles (b) onto which the plurality of granules are not bonded, the ratio of an average particle diameter (ra) of the magnetic iron oxide particles (a) to an average particle diameter (rb) of the magnetic iron oxide particles (b) [(ra)/(rb)] is not more than 1.0, preferably 1.1 to 150, more preferably 1.1 to 125 and still more preferably 1.1 to 100.

The mixing ratio between the magnetic iron oxide particles (a) and the magnetic iron oxide particles (b) contained in the magnetic carrier for electrophotographic developers according to the present invention is preferably controlled as follows. That is, the content of the magnetic iron oxide particles (a) in the magnetic carrier is preferably in the range of 5 to 95% by weight based on 100% by weight as a total weight of the magnetic iron oxide particles contained in the magnetic carrier for electrophotographic developers according to the present invention. When the content of the magnetic iron oxide particles (a) in the magnetic carrier is less than 5% by weight, it may be difficult to allow the magnetic iron oxide particles (a) to expose to a surface of the respective spherical magnetic composite particles, so that formation of irregularities on the spherical magnetic composite particles owing to presence of the magnetic iron oxide particles onto which the plurality of granules are bonded tends to be insufficient. When the content of the magnetic iron oxide particles (a) in the magnetic carrier is more than 95% by weight, it may be difficult to obtain spherical magnetic composite particles having a high sphericity. The content of the magnetic iron oxide particles (a) in the magnetic carrier is more preferably in the range of 10 to 70% by weight based on 100% by weight as a total weight of the magnetic iron oxide particles contained in the magnetic carrier.

The surface of the respective magnetic iron oxide particles used in the present invention is preferably previously subjected to lipophilic treatment. With such a lipophilic treatment, it is possible to more readily obtain a magnetic carrier having a spherical shape.

The lipophilic treatment may be suitably performed by the method of treating the magnetic iron oxide particles with a coupling agent such as a silane coupling agent or a titanate coupling agent, or the method of dispersing the magnetic iron oxide particles in an aqueous medium comprising a surfactant to allow the particles to adsorb the surfactant on a surface thereof.

Examples of the silane coupling agent include those having a hydrophobic group, an amino group or an epoxy group. Specific examples of the silane coupling agent having a hydrophobic group include vinyl trichlorosilane, vinyl triethoxysilane and vinyl-tris(β-methoxy) silane. Examples of the silane coupling agent having an amino group include γ-aminopropyl triethoxysilane, N-β(aminoethyl)-γ-aminopropyl trimethoxysilane, N-β(aminoethyl)-γ-aminopropylmethyl dimethoxysilane and N-phenyl-γ-aminopropyl trimethoxysilane. Examples of the silane coupling agent having an epoxy group include γ-glycidoxypropylmethyl diethoxysilane, γ-glycidoxypropyl trimethoxysilane and γ-(3,4-epoxycyclohexyl) trimethoxysilane.

As the titanate coupling agent, there may be used isopropyl triisostearoyl titanate, isopropyl tridecylbenzenesulfonyl titanate, isopropyl tris(dioctylpyrophosphate) titanate or the like.

As the surfactant, there may be used commercially available surfactants. Among these surfactants, those surfactants having a functional group capable of bonding to a hydroxyl group in the magnetic iron oxide particles or on the surface thereof are more suitably used, and the ionicity of the surfactants is preferably cationic or anionic.

Although the objects of the present invention can be achieved by using any of the above treatments, from the viewpoint of good adhesion to the phenol resin, the treatments with the silane coupling agent having an amino group or an epoxy group are preferred.

The treating amount of the above coupling agent or surfactant is preferably 0.1 to 10% by weight based on the weight of the magnetic iron oxide particles to be treated.

Examples of the phenol compound used in the present invention include phenol; alkyl phenols such as m-cresol, p-cresol, p-tert-butyl phenol, o-propyl phenol, resorcinol and bisphenol A; and compounds having a phenolic hydroxyl group such as halogenated phenols obtained by replacing a part or whole of alkyl groups of the above alkyl phenols with a chlorine atom or a bromine atom. Among these phenol compounds, most preferred is phenol.

Examples of the aldehyde compound used in the present invention include formaldehyde which may be in the form of either formalin or para-aldehyde, acetaldehyde, furfural, glyoxal, acrolein, crotonaldehyde, salicylaldehyde and glutaraldehyde. Among these aldehyde compounds, most preferred is formaldehyde.

The molar ratio of the aldehyde compound to the phenol compound is preferably 1.0 to 4.0. When the molar ratio of the aldehyde compound to the phenol compound is less than 1.0, it may be difficult to produce the aimed particles, or since curing of the resin hardly proceeds, there is a tendency that the obtained particles have a low strength. When the molar ratio of the aldehyde compound to the phenol compound is more than 4.0, there is a tendency that the amount of the unreacted aldehyde compound remaining in the aqueous medium after the reaction is increased. The molar ratio of the aldehyde compound to the phenol compound is more preferably 1.2 to 3.0.

As the basic catalyst used in the present invention, there may be mentioned those basic catalysts ordinarily used for production of resol resins. Examples of the basic catalyst include aqueous ammonia, and alkyl amines such as hexamethylenetetramine, dimethyl amine, diethyl triamine and polyethylene imine. Among these basic catalysts, especially preferred is aqueous ammonia. The molar ratio of the basic catalyst to the phenol compound is preferably 0.05 to 1.50. When the molar ratio of the basic catalyst to the phenol compound is less than 0.05, curing of the resin tends to hardly proceed sufficiently, so that it may be difficult to granulate the particles. When the molar ratio of the basic catalyst to the phenol compound is more than 1.50, the structure of the phenol resin tends to be adversely affected, resulting in deteriorated granulation of the particles, so that it may be difficult to obtain particles having a large particle diameter.

In the present invention, the reaction may be carried out in the aqueous medium. The concentration of solid components in the aqueous medium is preferably controlled to 30 to 95% by weight and more preferably 60 to 90% by weight.

The reaction solution to which the basic catalyst is added is heated to the temperature range of 60 to 90° C., and reacted at that temperature for 30 to 300 min, preferably 60 to 240 min, to subject the resulting phenol resin to polycondensation reaction for curing thereof.

In the above reaction, in order to obtain spherical magnetic composite particles having a high sphericity, the reaction temperature is preferably gradually increased. The temperature rise rate is preferably 0.5 to 1.5° C./min and more preferably 0.8 to 1.2° C./min.

Also, in the above reaction, in order to well control the particle diameter of the obtained particles, the stirring speed of the reaction solution is suitably adjusted. The stirring speed is preferably 100 to 1000 rpm.

After completion of curing the resin, the reaction product is cooled to a temperature of not higher than 40° C., thereby obtaining a water dispersion of the spherical magnetic composite particles comprising the magnetic iron oxide particles dispersed in the binder resin and exposed to the surface of the respective particles.

The thus obtained water dispersion comprising the spherical magnetic composite particles is subjected to solid-liquid separation by ordinary methods such as filtration and centrifugal separation, and then the obtained solids are washed and dried, thereby obtaining the aimed spherical magnetic composite particles.

In the present invention, the reaction for forming a coating layer comprising a copolymer resin obtained by curing a melamine resin and a phenol resin on the surface of the respective spherical magnetic composite particles may be carried out as follow. That is, without subjecting the water dispersion comprising the spherical magnetic composite particles to solid-liquid separation, a melamine compound, an aldehyde compound, an acid catalyst and water are freshly added thereto, and the obtained mixture is heated to a reaction temperature range of 70 to 95° C. and preferably 80 to 90° C. at which the unreacted phenol compound remaining in the water dispersion is allowed to react with these compounds, thereby curing and adsorbing the obtained resin onto the surface of the respective spherical magnetic composite particles to form the resin coating layer thereon.

The resulting water dispersion comprising the spherical magnetic composite particles is subjected to solid-liquid separation by an ordinary method such as filtration and centrifugal separation, followed by washing and drying the thus separated solids, thereby obtaining spherical magnetic composite particles having the coating layer comprising the copolymer resin obtained by curing the melamine resin and the phenol resin on the surface of the respective spherical magnetic composite particles produced by uniformly dispersing the magnetic iron oxide particles in a phenol resin matrix.

Examples of the melamine compound used for forming the coating layer in the present invention include melamine, formaldehyde adducts of melamine such as, for example, dimethylol melamine, trimethylol melamine and hexamethylol melamine, and initial condensates of melamine and formaldehyde.

The amount of the melamine added to the spherical magnetic composite particles is preferably 0.1 to 5.0% by weight. When the amount of the melamine added is less than 0.1% by weight, it may be difficult to coat the particles therewith to a sufficient extent. On the other hand, when the amount of the melamine added is more than 5.0% by weight, the electric resistance value of the obtained coated particles tends to be excessively high.

The aldehyde compound used for forming the coating layer may be appropriately selected from those which are usable in the reaction for production of the above spherical magnetic composite particles.

The acid catalyst used for forming the coating layer in the present invention may include those acids capable of rendering the reaction system weakly acidic. Examples of the acids include formic acid, oxalic acid, ammonium chloride and acetic acid.

The melamine resin is capable of forming a uniform and thin coating layer on the surface of the respective magnetic composite particles and therefore enhancing an electric resistance of the magnetic carrier in an effective manner.

Since the melamine resin has a positive charging property, the magnetic carrier can be enhanced in a positive charging property by forming the melamine resin coating layer thereon.

Since the melamine resin is capable of forming a hard film, the magnetic carrier can also be enhanced in durability.

The magnetic carrier according to the present invention may also be formed by coating the surface of the spherical composite particles with a resin.

The coating resin used in the present invention is not particularly limited. Examples of the coating resin include polyolefin-based resins such as polyethylene and polypropylene; polystyrene; acrylic resins; polyacrylonitrile; polyvinyl-based or polyvinylidene-based resins such as polyvinyl acetate, polyvinyl alcohol, polyvinyl butyral, polyvinyl chloride, polyvinyl carbazole, polyvinyl ether and polyvinyl ketone; vinyl chloride/vinyl acetate copolymers and styrene/acrylic acid copolymers; straight silicone-based resins having an organosiloxane bond and modified products thereof; fluorine-based resins such as polytetrafluoroethylene, polyvinyl fluoride, polyvinylidene fluoride and polychlorotrifluoroethylene; polyesters; polyurethanes; polycarbonates; amino-based resins such as urea/formaldehyde resins; epoxy-based resins; polyamide resins; polyimide resins; polyamide imide resins; fluorine-containing polyamide resins; fluorine-containing polyimide resins; and fluorine-containing polyamide imide resins.

In the magnetic carrier according to the present invention, the surface of the spherical composite particles is preferably coated with at least one resin selected from the group consisting of silicone-based resins, fluorine-based resins, acrylic resins and styrene-acrylic resins. When coating the surface of the spherical composite particles with the acrylic resins or the styrene-acrylic resins, the effect of enhancing adhesion to the core particles as well as a charging property of the resulting magnetic carrier can be attained. In addition, when coating the surface of the spherical composite particles with the silicone-based resins or the fluorine-based resins which have a low surface energy, it is possible to suppress formation of spent toner.

Examples of the acrylic resins include copolymers obtained by copolymerizing an alkyl acrylate such as methyl methacrylate, methyl ethacrylate, ethyl methacrylate, butyl methacrylate, lauryl methacrylate, stearyl methacrylate and behenyl methacrylate, a cycloalkyl acrylate such as cyclopentyl methacrylate and cyclohexyl methacrylate, or an aromatic acrylate such as phenyl acrylate, with acrylic acid, copolymers obtained by copolymerizing the above acrylates with an epoxy compound such as glycidyl methacrylate, and copolymers obtained by copolymerizing the above acrylates with an alcohol-based compound such as glycerol monomethacrylate and 2-hydroxyethyl methacrylate. In view of less environmental dependency or the like of the resulting magnetic carrier, among these acrylic resins, preferred are those produced using short-chain alkyl acrylates such as methyl methacrylate and ethyl ethacrylate.

Examples of the styrene-acrylic resins include copolymers of the above acrylic monomers with styrene-based monomers. In view of a less difference in charge amount between under high-temperature and high-humidity conditions and under low-temperature and low-humidity conditions, preferred styrene-acrylic resins are copolymers of styrene with short-chain alkyl methacrylates.

Examples of the preferred silicone-based resin include condensation reaction-type silicone resins. Examples of the preferred fluorine-based resins include polyfluorinated acrylate resins, polyfluorinated methacrylate resins, polyfluorinated vinylidene resins, polytetrafluoroethylene resins, polyhexafluoropropylene resins, and copolymers obtained by combination of these resins.

The coating amount of the resin on the magnetic carrier of the present invention is preferably 0.1 to 5.0% by weight based on the weight of the spherical magnetic composite particles. When the coating amount of the resin is less than 0.1% by weight, it may be difficult to sufficiently coat the particles with the resin, resulting in unevenness of the obtained resin coat. When the coating amount of the resin is more than 5.0% by weight, although the resin coat can adhere onto the surface of the respective composite particles, the thus produced composite particles tend to be agglomerated together, so that it may be difficult to well control the particle size of the composite particles. The coating amount of the resin on the magnetic carrier is more preferably 0.15 to 3.0% by weight.

In the present invention, the resin coating layer may also comprise fine particles. Examples of the suitable fine particles include those fine particles capable of imparting a negative charging property to a toner such as fine particles of quaternary ammonium salt-based compounds, triphenylmethane-based compounds, imidazole-based compounds, nigrosine-based dyes, polyamine resins, etc., and those fine particles capable of imparting a positive charging property to a toner such as fine particles of dyes comprising metals such as Cr and Co, salicylic acid metal salt compounds, alkyl salicylic acid metal salt compounds, etc. These fine particles may be used singly or in combination of any two or more thereof.

Also, in the present invention, the resin coating layer may also comprise conductive fine particles. It is advantageous to incorporate the conductive fine particles into the resin, because the resulting magnetic carrier can be readily controlled in resistance thereof. As the conductive fine particles, there may be used conventionally known fine particles. Examples of the conductive fine particles include fine particles of carbon blacks such as acetylene black, channel black, furnace black and Ketjen black; carbides of metals such as Si and Ti; nitrides of metals such as B and Ti; and borates of metals such as Mo and Cr. These conductive fine particles may be used singly or in combination of any two or more thereof. Among these conductive fine particles, preferred are fine particles of carbon blacks.

When coating the surface of the respective spherical magnetic composite particles with the resin, there may be used the method of spraying the resin onto the spherical magnetic composite particles using a known spray dryer, the method of dry-mixing the spherical magnetic composite particles and the resin using a Henschel mixer, a high-speed mixer, etc., the method of immersing the spherical magnetic composite particles in a solvent comprising the resin, or the like.

Next, the two-component system developer of the present invention is described.

As the toner used in combination with the magnetic carrier according to the present invention, there may be mentioned any conventionally known toners. More specifically, there may be used those toners comprising a binder resin and a colorant as main components together with a release agent, a magnetic material, a fluidizing agent, etc., which may be added to the main components, if required. Also, the toners may be produced by known methods.

<Functions>

The magnetic iron oxide particles of the present invention have such a configuration that a plurality of granules are bonded thereto and an appropriate particle diameter. As a result, it is suggested that the magnetic iron oxide particles of the present invention are excellent in bonding property to a resin.

In the present invention, the plurality of granules which have been conventionally regarded as primary particles are bonded to the magnetic iron oxide particles. As a result, as shown in the below-mentioned Examples and Comparative Examples, it has been apparently found that the resulting composite particles have an excellent bonding property to a resin.

Further, an important point of the present invention resides in that the magnetic carrier of the present invention comprises spherical composite particles obtained by dispersing magnetic iron oxide particles onto which a plurality of granules are bonded in a binder resin, and irregularities are formed on a surface of the respective composite particles owing to the magnetic iron oxide particles onto which the plurality of granules are bonded.

As a result, the irregularities formed owing to the magnetic iron oxide particles onto which the plurality of granules are bonded serve for enhancing adhesion of the particles to a coating resin to a large extent, so that the resulting magnetic carrier can maintain a good electric resistance value for a long period of time.

Accordingly, the magnetic carrier for electrophotographic developers according to the present invention and an electrophotographic developer using the magnetic carrier can be suitably used in a developing device of copying machines or printers requiring a good durability.

EXAMPLES

The present invention is described in more detail by the following Examples. However, these Examples are only illustrative and not intended to limit the present invention thereto. In the followings, Examples 1-1 to 1-6 and Comparative Examples 1-1 to 1-5 are those for explaining Inventions 1 to 3, whereas Examples 2-1 to 2-16 and Comparative Examples 2-1 to 2-16 are those for explaining Inventions 4 to 9. In the below-mentioned Examples and Comparative Examples, the following evaluation methods were used.

The shape of the magnetic iron oxide particles was determined from micrographs obtained by observing the particles using a scanning electron microscope "S-4800" manufactured by Hitachi High-Technologies Corp. The size of the granules bonded to the particles was determined by the similar method. Specifically, the shape of the granules bonded was estimated from the plane constituting the respective granules to examine whether or not the respective granules granule had any particular shape, i.e., an octahedral shape, a hexahedral shape, a polyhedral shape, a spherical shape or the like, and the particle size of the respective granules was measured from the thus estimated shape.

The average particle diameter (primary particle diameter) of the magnetic iron oxide particles was expressed by the number-average particle diameter measured using a laser diffraction particle size distribution meter "LA500" manufactured by Horiba Seisakusho Co., Ltd.

The BET specific surface area value of the magnetic iron oxide particles was measured by a BET method using "Mono Sorb MS-II" manufactured by Yuasa Ionics Co., Ltd.

The amounts of metal elements contained in the magnetic iron oxide particles were measured by a "Fluorescent X-ray Analyzer RIX-2100" manufactured by Rigaku Denki Kogyo Co., Ltd., and expressed by the values determined in terms of amounts of the respective elements based on the magnetic iron oxide particles.

The saturation magnetization of the magnetic iron oxide particles was expressed by the value measured using a vibration sample magnetometer "VSM-3S-15" manufactured by Toei Kogyo Co., Ltd., by applying an external magnetic field of 795.8 kA/m (10 kOe) thereto.

The vehicle color L* value of the magnetic iron oxide particles was measured by the following method. That is, 0.5 g of each sample, 0.5 mL of castor oil and 1.5 g of titanium dioxide were intimately kneaded with each other by a Hoover's muller to obtain a paste. Then, 4.5 g of clear lacquer was added to the obtained paste, and the resulting mixture was intimately kneaded to form a paint. The obtained paint was applied on a cast-coated paper by using a 150 μm (6-mil) applicator to produce a coating film piece (having a coating film thickness of about 30 μm). The hue of the coating film piece was measured using a spectro-color meter "Color Guide" (manufactured by BYK-Gardner GmbH), and expressed by a color specification index (L* value) according to JIS Z 8929.

The desorption of the magnetic iron oxide particles from the surface of the resin carrier was evaluated by the following method. That is, the resin kneaded material obtained by kneading the magnetic iron oxide particles with a styrene-acrylic resin was pulverized to prepare particles of the resin kneaded material. The resin kneaded material particles were shaken for 3 hr using a paint shaker to allow the magnetic iron oxide particles to desorb from the surface of the resin carrier.

The amount of the magnetic iron oxide particles desorbed from the surface of the resin carrier was observed using an electron microscope to evaluate the observation results according to the following three ratings.

A: Substantially no magnetic iron oxide particles desorbed were observed.

B: Some magnetic iron oxide particles desorbed were observed.

C: A number of magnetic iron oxide particles desorbed were observed.

The average particle diameter of the spherical magnetic composite particles was expressed by the volume-average particle diameter measured using a laser diffraction particle size distribution meter "LA750" manufactured by Horiba Seisakusho Co., Ltd.

The shape of the spherical magnetic composite particles was determined from micrographs obtained by observing the particles using a scanning electron microscope "S-4800" manufactured by Hitachi High-Technologies Corp.

The true specific gravity was measured using a multivolume density meter "1305 Model" manufactured by Mictromeritics/Shimadzu Corp.

The electric resistance value (volume resistivity) of the spherical magnetic composite particles was expressed by the value obtained by measuring an electric resistance of 1.0 g of sample particles using a "High Resistance Meter 4339B" manufactured by Yokogawa Hewlett Packard Co., Ltd.

<Forced Deterioration Test of Rein-Coated Carrier>

The forced deterioration test of the resin-coated carrier was carried out as follows. That is, 10 g of the resin-coated carrier were charged into a sample mill "SK-M10 Model" manufactured by Kyoritsu Rikoh Co., Ltd. After fixing a lid onto the sample mill with a belt, the contents of the sample mill were stirred at 16000 rpm for 60 sec.

The electric resistance values before and after the deterioration test were evaluated as follows. That is, the rate of change between electric resistance values of each sample before and after being stirred as measured at normal temperature and normal humidity (24° C. and 60% RH) was calculated according to the following formula to obtain an absolute value thereof, and the results were evaluated according to the following ratings. Rank A and Rank B are practically acceptable levels.

Rate of change in electric resistance value=$\mathrm{Log}(R_{INI}/R)$ wherein $R_{INI}$ is an electric resistance value before the forced deterioration test at an applied voltage of 100 V; and R is an electric resistance value after the forced deterioration test at an applied voltage of 100 V.

A: Absolute value of a rate of change in electric resistance value between before and after the forced deterioration test was not less than 0 and less than 0.5;

B: Absolute value of a rate of change in electric resistance value between before and after the forced deterioration test was not less than 0.5 and less than 1.0;

C: Absolute value of a rate of change in electric resistance value between before and after the forced deterioration test was not less than 1.0 and less than 1.5; and D: Absolute value of a rate of change in electric resistance value between before and after the forced deterioration test was not less than 1.5.

Examples 1-1

Method for Producing Iron Oxide Particles

Ten liters of a ferrous sulfate aqueous solution comprising 1.9 mol/L of $Fe^{2+}$ and 4 L of a 12N sodium hydroxide aqueous solution were charged into a reactor, and reacted at 95° C. at a stirring rotating speed of 5 rpm while passing oxygen therethrough at a flow rate of 1.5 L/min. At this time, the concentration of iron reacted was 1.36 mol/L. After completion of the reaction, the obtained reaction solution was successively subjected to filtration, washing with water, drying and pulverization, thereby obtaining magnetic iron oxide particles.

The thus obtained magnetic iron oxide particles had such a shape that a plurality of granules were bonded thereto as apparently shown in FIG. 1. Also, it was confirmed that the magnetic iron oxide particles had an average particle diameter of 3.1 μm, a BET specific surface area of 1.5 m²/g, a vehicle color L* value of 72.1 and a saturation magnetization value of 89.1 Am²/kg.

The resin kneaded material obtained by kneading the resulting magnetic iron oxide particles with a styrene-acrylic resin was pulverized to prepare particles of the resin kneaded material. The thus obtained resin kneaded material particles were evaluated for desorption of the magnetic iron oxide particles therefrom. As a result, it was confirmed that substantially no magnetic iron oxide particles desorbed were present, and therefore a sufficient effect of preventing desorption of the particles from the resin kneaded material was attained.

Examples 1-2 to 1-6 and Comparative Examples 1-1 and 1-2

The same procedure as described in Example 1-1 was conducted except that the production conditions of the magnetic iron oxide particles were changed variously, thereby obtaining magnetic iron oxide particles.

Comparative Example 1-3

Twenty five (25.0) liters of a ferrous sulfate aqueous solution comprising 1.6 mol/L of $Fe^{2+}$ were charged into a reactor previously filled with 24.5 L of a 3.1N sodium hydroxide aqueous solution (corresponding to 0.95 equivalent based on $Fe^{2+}$), and the contents of the reactor were adjusted to a pH value of 6.7 and reacted at 90° C. to produce a ferrous salt suspension comprising a ferrous hydroxide colloid. Then, a first stage reaction of the thus obtained ferrous salt suspension was initiated while flowing air therethrough at a rate of 80 L/min, and simultaneously 0.3 L of a diluted solution prepared by diluting 123.4 g of water glass #3 ($SiO_2$: 28.8% by weight) as a silicon component (corresponding to 1.7 atom percent in terms of Si based on Fe) with water was added thereto. After adding the water glass solution, the oxidation reaction of the reaction solution was continued while stirring, and then the first stage reaction was terminated to obtain a ferrous salt suspension comprising magnetite core crystal particles. At this time, it was confirmed that after initiating the oxidation reaction, the pH value of the reaction solution subsequent to the time at which the oxidation degree of $Fe^{2+}$ exceeded 10% was in the range of 7.0 to 8.5.

After completion of the first stage reaction, 1.6 L of a 9N sodium hydroxide aqueous solution and 3.4 L of a ferrous sulfate aqueous solution comprising 1.6 mol/L of $Fe^{2+}$ were added to the resulting ferrous salt suspension comprising the magnetite core crystal particles to adjust a pH value of the suspension to 9.5. The resulting suspension was subjected to a second stage reaction at 90° C. while flowing air therethrough at a rate of 100 L/min for 30 min, thereby producing magnetite particles. The thus obtained particles were subjected to washing with water, filtration, drying and pulverization by ordinary methods. The amount of the ferrous sulfate aqueous solution added in the second stage reaction was 13.8 atom percent based on the amount of the ferrous sulfate aqueous solution added in the first stage reaction, and the amount of the sodium hydroxide aqueous solution added in the second stage reaction was 1.1 equivalent based on $Fe^{2+}$ being present in the reaction solution.

The thus obtained magnetite particles had basically a spherical shape but such a shape as formed with angular protrusions. In addition, the magnetite particles had an average particle diameter of 0.20 μm and a BET specific surface area value of 9.2 m²/g.

The resin kneaded material obtained by kneading the resulting magnetite particles with a styrene-acrylic resin was pulverized to prepare particles of the resin kneaded material. The thus obtained resin kneaded material particles were evaluated for desorption of the magnetic iron oxide particles therefrom. As a result, it was confirmed that a large number of the magnetic iron oxide particles desorbed were observed, and therefore the effect of preventing desorption of the particles was insufficient.

Comparative Example 1-4

A dried molded product comprising spherical magnetite particles having an average particle diameter of 0.23 μm was treated using a twin-screw kneader (model name: TEX-54KC) manufactured by The Japan Steel Works, Ltd., under the conditions including L/D (ratio of a cylinder length L to a cylinder diameter D of the twin-screw kneader) of 10.7 and ESP (electric energy per 1 kg of a powder) of 0.21 kWh/kg.

The diameter of aggregated particles of the thus obtained magnetite particles was measured by a pigment dispersion testing method according to JIS-K-5101. The point of a scale of a grind meter at which three particles having the same particle diameter were present was determined as a diameter of the aggregated particles of the sample. As a result of the measurement, it was confirmed that the diameter of the aggregated particles of the magnetite particles was 7.6 μm.

Comparative Examples 1-5

A ferrous sulfate aqueous solution comprising 1.7 mol/L of $Fe^{2+}$ in an amount of 21.2 L was reacted with 4.7 L of a 18.5N sodium hydroxide solution and 19 L of water to obtain a ferrous salt aqueous reaction solution comprising a ferrous iron colloid. Next, the resulting ferrous salt aqueous reaction solution was subjected to oxidation reaction while being kept at 90° C. and flowing air thereinto at a rate of 100 L/min. After completion of the oxidation reaction, the resulting reaction solution was subjected to filtration, washing with water, wet-pulverization using a ball mill and then fluidized-bed drying using a spray dryer, thereby obtaining magnetic iron oxide particles having an octahedral shape.

The production conditions of the magnetic iron oxide particles are shown in Table 1, and various properties of the magnetic iron oxide particles are shown in Table 2.

TABLE 1

| Examples and Comp. Examples | Iron raw material | | |
|---|---|---|---|
| | Kind | Concentration (mol/L) | Amount (L) |
| Example 1-1 | Ferrous sulfate | 1.9 | 10 |
| Example 1-2 | Ferrous sulfate | 1.9 | 10 |
| Example 1-3 | Ferrous sulfate | 1.9 | 10 |
| Example 1-4 | Ferrous sulfate | 1.9 | 10 |
| Example 1-5 | Ferrous sulfate | 1.9 | 10 |
| Example 1-6 | Ferrous sulfate | 1.9 | 10 |
| Comp. Example 1-1 | Ferrous sulfate | 1.9 | 10 |
| Comp. Example 1-2 | Ferrous sulfate | 1.9 | 10 |

| Examples and Comp. Examples | Alkali raw material | | | |
|---|---|---|---|---|
| | Kind | Concentration (mol/L) | Amount (L) | Equivalent ratio |
| Example 1-1 | Sodium hydroxide | 12 | 4 | 1.26 |
| Example 1-2 | Sodium hydroxide | 10 | 4 | 1.05 |
| Example 1-3 | Sodium hydroxide | 11 | 4 | 1.16 |
| Example 1-4 | Sodium hydroxide | 12 | 4 | 1.26 |
| Example 1-5 | Sodium hydroxide | 12 | 4 | 1.26 |
| Example 1-6 | Sodium hydroxide | 11 | 4.5 | 1.30 |
| Comp. Example 1-1 | Sodium hydroxide | 5 | 9 | 1.18 |
| Comp. Example 1-2 | Sodium hydroxide | 11 | 4 | 1.16 |

TABLE 1-continued

| Examples and Comp. Examples | Other elements | | |
|---|---|---|---|
| | Kind | Concentration (mol/L) | Amount (L) |
| Example 1-1 | | | |
| Example 1-2 | | | |
| Example 1-3 | | | |
| Example 1-4 | Water glass #3 | 1.00 | 0.1 |
| Example 1-5 | Magnesium sulfate | 1.1 | 0.1 |
| Example 1-6 | | | |
| Comp. Example 1-1 | | | |
| Comp. Example 1-2 | | | |

| Examples and Comp. Examples | Reaction temperature (° C.) | Concentration of iron reacted (mol/L) | Stirring rotating speed (rpm) | Amount of oxygen (L/min) |
|---|---|---|---|---|
| Example 1-1 | 95 | 1.36 | 5 | 1.5 |
| Example 1-2 | 95 | 1.36 | 5 | 2 |
| Example 1-3 | 95 | 1.36 | 5 | 2 |
| Example 1-4 | 95 | 1.35 | 5 | 2 |
| Example 1-5 | 95 | 1.35 | 5 | 2 |
| Example 1-6 | 95 | 1.31 | 5 | 1.5 |
| Comp. Example 1-1 | 95 | 1.00 | 5 | 1.5 |
| Comp. Example 1-2 | 95 | 1.36 | 10 | 10 |

TABLE 2

| Examples and Comp. Examples | Properties of magnetic iron oxide particles | | |
|---|---|---|---|
| | Average particle diameter (X) (μm) | Shape | Size of granules (μm) |
| Example 1-1 | 3.1 | Plural granules were bonded | 0.3 |
| Example 1-2 | 1.4 | Plural granules were bonded | 0.1 |
| Example 1-3 | 2.5 | Plural granules were bonded | 0.2 |
| Example 1-4 | 2.7 | Plural granules were bonded | 0.2 |
| Example 1-5 | 2.9 | Plural granules were bonded | 0.2 |
| Example 1-6 | 7.1 | Plural granules were bonded | 0.4 |
| Comp. Example 1-1 | 0.2 | Octahedral shape | — |
| Comp. Example 1-2 | 1.4 | Octahedral shape | — |
| Comp. Example 1-3 | 0.2 | Spherical shape with angular protrusions | — |
| Comp. Example 1-4 | 0.2 | Spherical shape | — |
| Comp. Example 1-5 | 0.3 | Octahedral shape | — |

TABLE 2-continued

| | Properties of magnetic iron oxide particles | | | |
|---|---|---|---|---|
| Examples and Comp. Examples | Shape of granules | BET (Sv) (m²/g) | 2/X | Vehicle color L* value |
| Example 1-1 | Octahedral shape | 1.5 | 0.6 | 72.1 |
| Example 1-2 | Octahedral shape | 6.3 | 1.4 | 62.1 |
| Example 1-3 | Octahedral shape | 3.4 | 0.8 | 65.4 |
| Example 1-4 | Octahedral shape | 3.5 | 0.7 | 68.7 |
| Example 1-5 | Octahedral shape | 3.3 | 0.7 | 71.2 |
| Example 1-6 | Octahedral shape | 1.0 | 0.3 | 75.3 |
| Comp. Example 1-1 | — | 3.4 | 10.0 | 53.4 |
| Comp. Example 1-2 | — | 1.2 | 1.4 | 59.8 |
| Comp. Example 1-3 | — | 9.2 | 10.0 | 40.5 |
| Comp. Example 1-4 | — | 7.0 | 10.0 | 38 |
| Comp. Example 1-5 | — | 5.5 | 6.7 | 39.5 |

| | Properties of magnetic iron oxide particles | | | Properties of resin kneaded material Amount of magnetic particles desorbed |
|---|---|---|---|---|
| Examples and Comp. Examples | Magnetization value (Am²/kg) | Si content (wt %) | Mg content (wt %) | |
| Example 1-1 | 89.1 | — | — | A |
| Example 1-2 | 87.4 | — | — | A |
| Example 1-3 | 87.7 | — | — | A |
| Example 1-4 | 86.5 | 0.2 | — | A |
| Example 1-5 | 84.6 | — | 0.2 | A |
| Example 1-6 | 89.9 | — | — | A |
| Comp. Example 1-1 | 87.1 | — | — | C |
| Comp. Example 1-2 | 89.0 | — | — | C |
| Comp. Example 1-3 | 87.5 | 0.5 | — | C |
| Comp. Example 1-4 | 84.4 | — | — | C |
| Comp. Example 1-5 | 87.9 | — | — | C |

The magnetic iron oxide particles obtained in Comparative Examples 1-1 to 1-5 failed to have such a shape that a plurality of granules were bonded thereto, and the specific surface Sv thereof was less than 2/X and the vehicle color L* value thereof was less than 60. Therefore, the magnetic iron oxide particles failed to exhibit a sufficient effect of preventing desorption of the particles from the resin.

The following Examples and Comparative Examples are those relating to the Inventions 4 to 9.

<Production of Iron Oxide Particles>

(Iron Oxide Particles A: The Same Particles as Obtained in Example 1-1)

Ten liters of a ferrous sulfate aqueous solution comprising 1.9 mol/L of $Fe^{2+}$ and 4 L of a 12N sodium hydroxide aqueous solution were charged into a reactor, and reacted at 95° C. at a stirring rotating speed of 5 rpm while passing oxygen therethrough at a flow rate of 1.5 L/min. At this time, the concentration of iron reacted was 1.36 mol/L. After completion of the reaction, the obtained reaction solution was successively subjected to filtration, washing with water, drying and pulverization, thereby obtaining magnetic iron oxide particles A.

The thus obtained magnetic iron oxide particles had such a shape that a plurality of granules were bonded thereto. Also, it was confirmed that the magnetic iron oxide particles had an average particle diameter of 3.1 μm, a BET specific surface area of 1.5 m²/g, a vehicle color L* value of 72.1 and a saturation magnetization value of 89.1 Am²/kg.

(Iron Oxide Particles B to I and K)

The same procedure as described for production of the above iron oxide particles A was conducted except that the production conditions of the magnetic iron oxide particles were changed variously, thereby obtaining magnetic iron oxide particles.

(Iron Oxide Particles J)

Twenty five (25.0) liters of a ferrous sulfate aqueous solution comprising 1.6 mol/L of $Fe^{2+}$ were charged into a reactor previously filled with 24.5 L of a 3.1N sodium hydroxide aqueous solution (corresponding to 0.95 equivalent based on $Fe^{2+}$), and the contents of the reactor were adjusted to a pH value of 6.7 and reacted at 90° C. to produce a ferrous salt suspension comprising a ferrous hydroxide colloid. Then, a first stage reaction of the thus obtained ferrous salt suspension was initiated while flowing air therethrough at a rate of 80 L/min, and simultaneously 0.3 L of a diluted solution prepared by diluting 123.4 g of water glass #3 ($SiO_2$: 28.8% by weight) as a silicon component (corresponding to 1.7 atom percent in terms of Si based on Fe) with water was added thereto. After adding the water glass solution, the oxidation reaction of the reaction solution was continued while stirring, and then the first stage reaction was terminated to obtain a ferrous salt suspension comprising magnetic iron oxide core crystal particles. At this time, it was confirmed that after initiating the oxidation reaction, the pH value of the reaction solution subsequent to the time at which the oxidation degree of $Fe^{2+}$ exceeded 10% was kept within the range of 7.0 to 8.5.

After completion of the first stage reaction, 1.6 L of a 9N sodium hydroxide aqueous solution and 3.4 L of a ferrous sulfate aqueous solution comprising 1.6 mol/L of $Fe^{2+}$ were added to the resulting ferrous salt suspension comprising the magnetite core crystal particles to adjust a pH value of the suspension to 9.5. Then, the resulting suspension was subjected to a second stage reaction at 90° C. while flowing air therethrough at a rate of 100 L/min for 30 min, thereby producing magnetic iron oxide particles. The thus obtained particles were subjected to washing with water, filtration, drying and pulverization by ordinary methods, thereby obtaining magnetic iron oxide particles J.

The thus obtained magnetic iron oxide particles had basically a spherical shape but such a shape as formed with angular protrusions. In addition, the magnetic iron oxide particles had an average particle diameter of 0.2 μm, a BET specific surface area value of 9.2 m²/g, a vehicle color L* value of 40.5 and a saturation magnetization value of 87.5 Am²/kg.

(Iron Oxide Particles L)

Those particles having a particle diameter of aggregated particles of 30 μm (number-average particle diameter: 0.23 μm; saturation magnetization: 83.5 emu/g; coercive force: 55 Oe) in the form of a dry molded product obtained by molding a cake comprising spherical magnetite particles and then drying the resulting molded product was treated using a twin-screw kneader (model name: TEX-54KC) manufactured by The Japan Steel Works, Ltd., under the conditions including L/D (ratio of a cylinder length L to a cylinder diameter D of the twin-screw kneader) of 10.7 and ESP (electric energy per 1 kg of a powder) of 0.21 kWh/kg.

As a result, it was confirmed that the thus obtained magnetic iron oxide particles had a particle diameter of aggregated particles of 7.6 μm, a number-average particle diameter of primary particles of 0.23 μm, a BET specific surface area of 7.0 m$^2$/g, a vehicle color L* value of 38.0 and a saturation magnetization value of 84.4 Am$^2$/kg.

The particle diameter of aggregated particles of the magnetic iron oxide particles was measured by the pigment dispersion testing method according to JIS-K-5101. The specific procedure for the above measurement was as follows. That is, 0.5 g of the magnetic iron oxide particles and 0.5 mL of castor oil were placed on a lower kneading plate of a Hoover's muller as described in JIS-K-5101, and kneaded with a spatula to spread over the kneading plate. An upper kneading plate was overlapped on the lower kneading plate, and after suspending a weight of 68.04 kg, the overlapped kneading plates were rotated by setting a rotating speed of the muller to 50 revolutions. After stopping the rotation of the muller, the upper kneading plate was lifted up to collect the pasty sample spread between the upper and lower kneading plates with a spatula. The thus collected pasty sample was spread again over the lower kneading plate, and the upper kneading plate was overlapped again on the lower kneading plate, and after suspending a weight of 68.04 kg, the overlapped kneading plates were rotated by setting a rotating speed of the muller to 50 revolutions to prepare a dispersed paste. The thus prepared dispersed paste was collected with a spatula and placed on a glass plate and diluted with 3 mL of dibutyl phthalate to measure a particle size (grain size) thereof using a grind meter as described in JIS-K-5101.

The particle size was measured as follows. That is, the point of a scale of the grind meter at which three particles having the same particle diameter were present was determined as a diameter of aggregated particles of the sample. Meanwhile, the above procedure was repeated five times, and an average value of the obtained five measured values was determined as a particle diameter of aggregated particles of the magnetic iron oxide particles.

(Iron Oxide Particles M)

A reactor was charged with 23.75 L of a ferrous sulfate aqueous solution comprising 1.6 mol/L of Fe$^{2+}$ and 26.25 L (corresponding to 0.95 equivalent based on Fe$^{2+}$) of a 2.75 mol/L sodium hydroxide aqueous solution, and the contents of the reactor were subjected to oxidation reaction (first stage reaction) at 90° C. while flowing air therethrough at a rate of 90 L/min. After completion of the first stage reaction, a sodium hydroxide aqueous solution was added to the resulting reaction solution such that the pH value of the reaction solution was controlled to 11, and the reaction solution was successively subjected to oxidation reaction (second stage reaction). After completion of the second stage reaction, the resulting reaction solution was further subjected to filtration, washing with water, drying and pulverization, thereby obtaining iron oxide particles M.

The thus obtained magnetic iron oxide particles had a spherical shape. In addition, the magnetic iron oxide particles had an average particle diameter of 0.2 μm, a BET specific surface area value of 7.2 m$^2$/g, a vehicle color L* value of 37.8 and a saturation magnetization value of 84.3 Am$^2$/kg.

<Lipophilic Treatment of Magnetic Iron Oxide Particles>
(Lipophilic Treatment 1: Magnetic Iron Oxide Particles A)

One thousand grams of granular magnetic iron oxide particles A were charged into a flask and fully stirred, and then 5.0 g of an epoxy group-containing silane-based coupling agent ("KBM-403" (tradename) produced by Shin-Etsu Chemical Corp.) were added to the flask. The contents of the flask were heated to about 100° C. and intimately mixed and stirred at that temperature for 30 min, thereby obtaining magnetic iron oxide particles coated with the silane-based coupling agent.

(Lipophilic Treatment 2: Magnetic Iron Oxide Particles B to M)

The same procedure as described above for production of the iron oxide particles A was conducted except that the lipophilic treatment conditions of the magnetic iron oxide particles were changed variously, thereby obtaining magnetic iron oxide particles coated with the coupling agent.

(Lipophilic Treatment 3: Strontium Ferrite)

The same procedure as described above for production of the iron oxide particles was conducted except that plate-shaped strontium ferrite (number-average particle diameter: 0.7 μm) was used as those particles to be subjected to the lipophilic treatment, in place of the magnetic iron oxide particles, thereby obtaining plate-shaped strontium ferrite particles coated with the coupling agent.

Example 2-1

Mixing of Magnetic Iron Oxide Particles after Lipophilic Treatment

A flask was charged with 1000 g in total of the magnetic iron oxide particles A subjected to the lipophilic treatment and the magnetic iron oxide particles M subjected to the lipophilic treatment at a mixing ratio (weight ratio) of 30:70, and the contents of the flask were intimately mixed and stirred at a stirring speed of 250 rpm for 30 min.

<Production of Spherical Magnetic Composite Particles>

| | |
|---|---|
| Phenol | 10 parts by weight |
| 37% Formalin | 15 parts by weight |
| Mixed particles prepared by mixing magnetic iron oxide particles A and magnetic iron oxide particles M after both being subjected to lipophilic treatment | 100 parts by weight |
| 25% Aqueous ammonia | 3.5 parts by weight |
| Water | 15 parts by weight |

The above materials were charged into a 1 L four-necked flask, and heated to 85° C. over 60 min while stirring at a stirring speed of 250 rpm, and then the contents of the flask were reacted and cured at the same temperature for 120 min, thereby producing spherical magnetic composite particles comprising the magnetic iron oxide particles and the binder resin.

Next, the contents of the flask were cooled to 30° C., and then a supernatant liquid was removed therefrom. Further, the resulting precipitate as a lower layer was washed with water and then air-dried. Next, the dried precipitate was dried at 180° C. under reduced pressure (not more than 5 mmHg) to obtain spherical magnetic composite particles 1 for magnetic core material particles.

As a result, it was confirmed that the resulting spherical magnetic composite particles 1 had an average particle diameter of 32 μm; a specific gravity of 3.76 g/cm$^3$; and a saturation magnetization value of 76.5 Am$^2$/kg.

Figure 2:
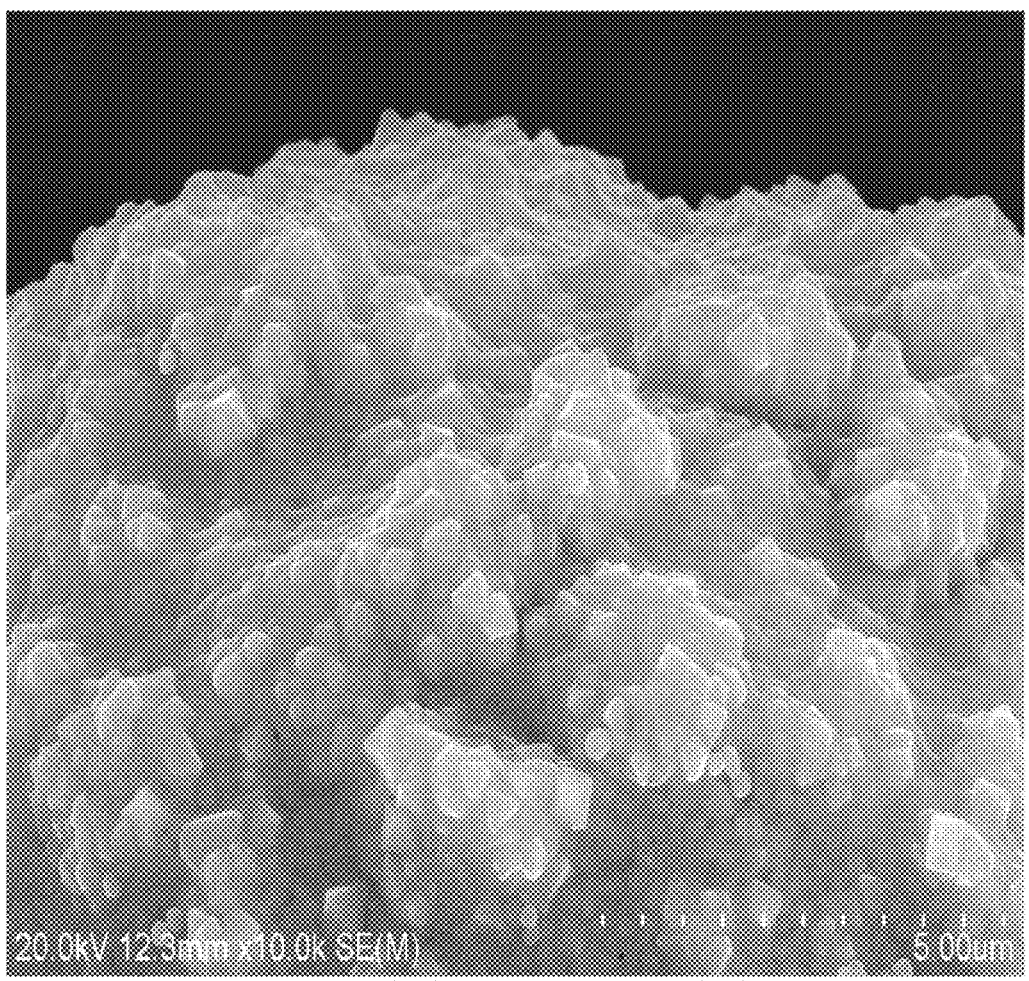
FIG. 2 is an electron micrograph showing the magnetic carrier obtained in Example 2-1 (magnification: ×10000 times).
Figure 3:
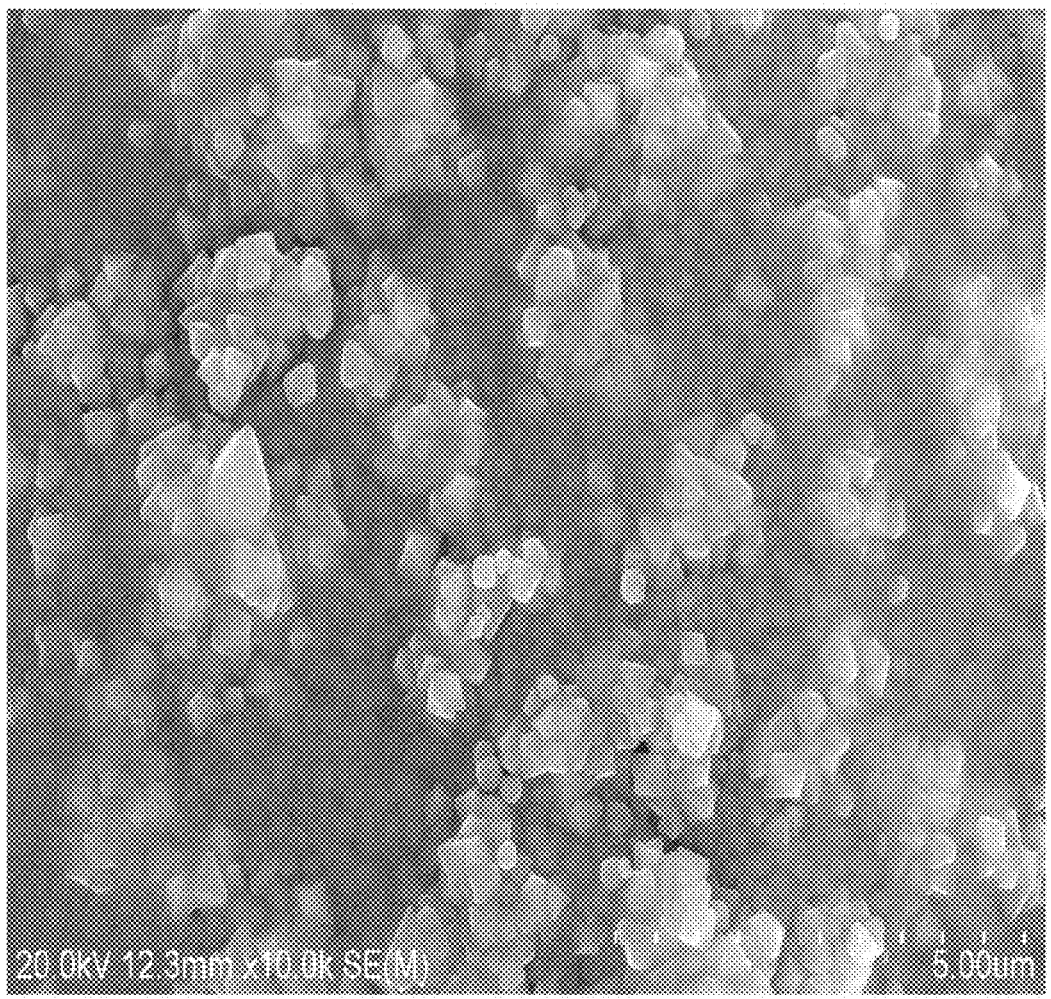
FIG. 3 is an electron micrograph showing the magnetic carrier obtained in Example 2-1 (magnification: ×10000 times).
Figure 4:
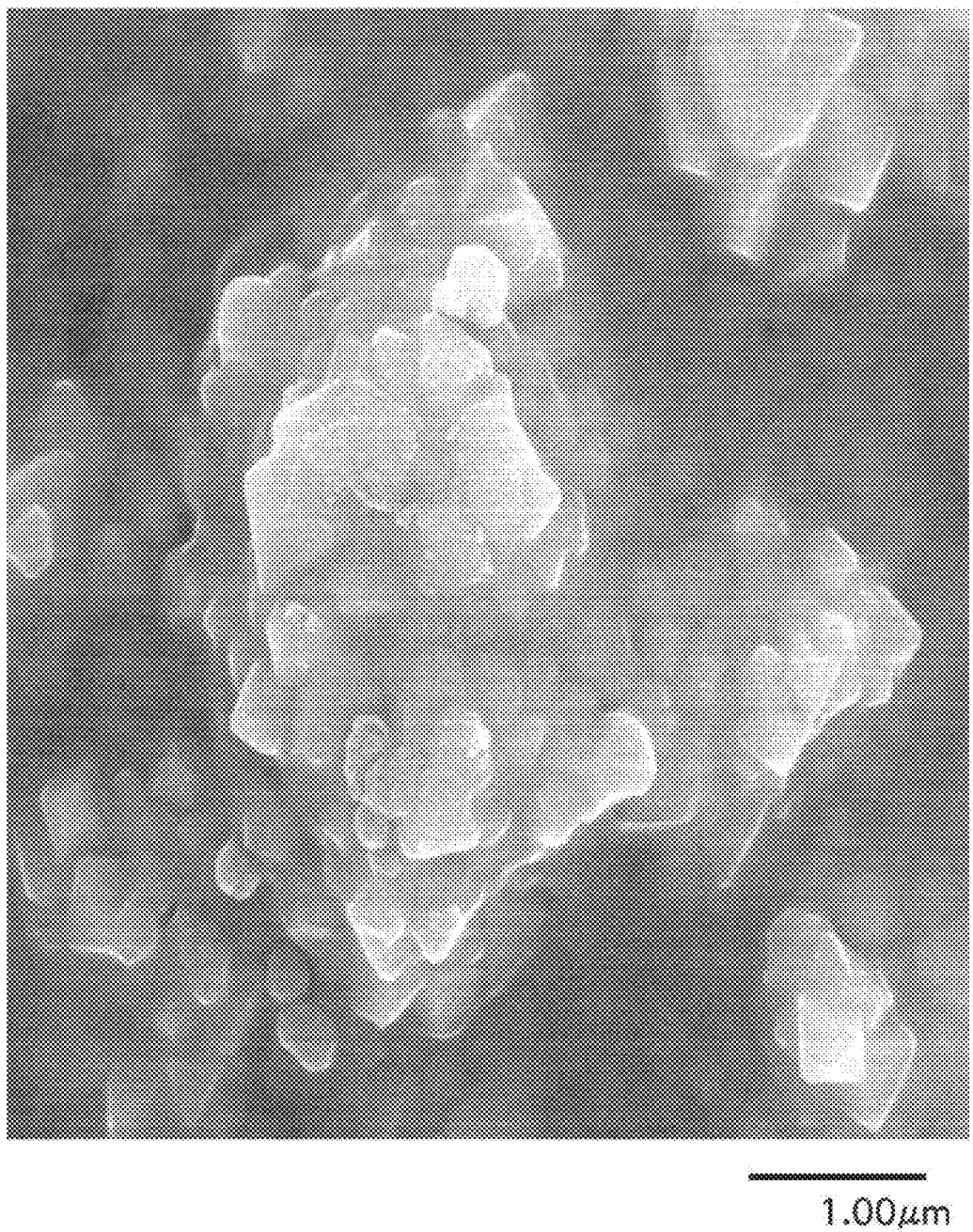
FIG. 4 is an electron micrograph showing the magnetic carrier obtained in Example 2-1 (magnification: ×10000 times).
Figure 5:
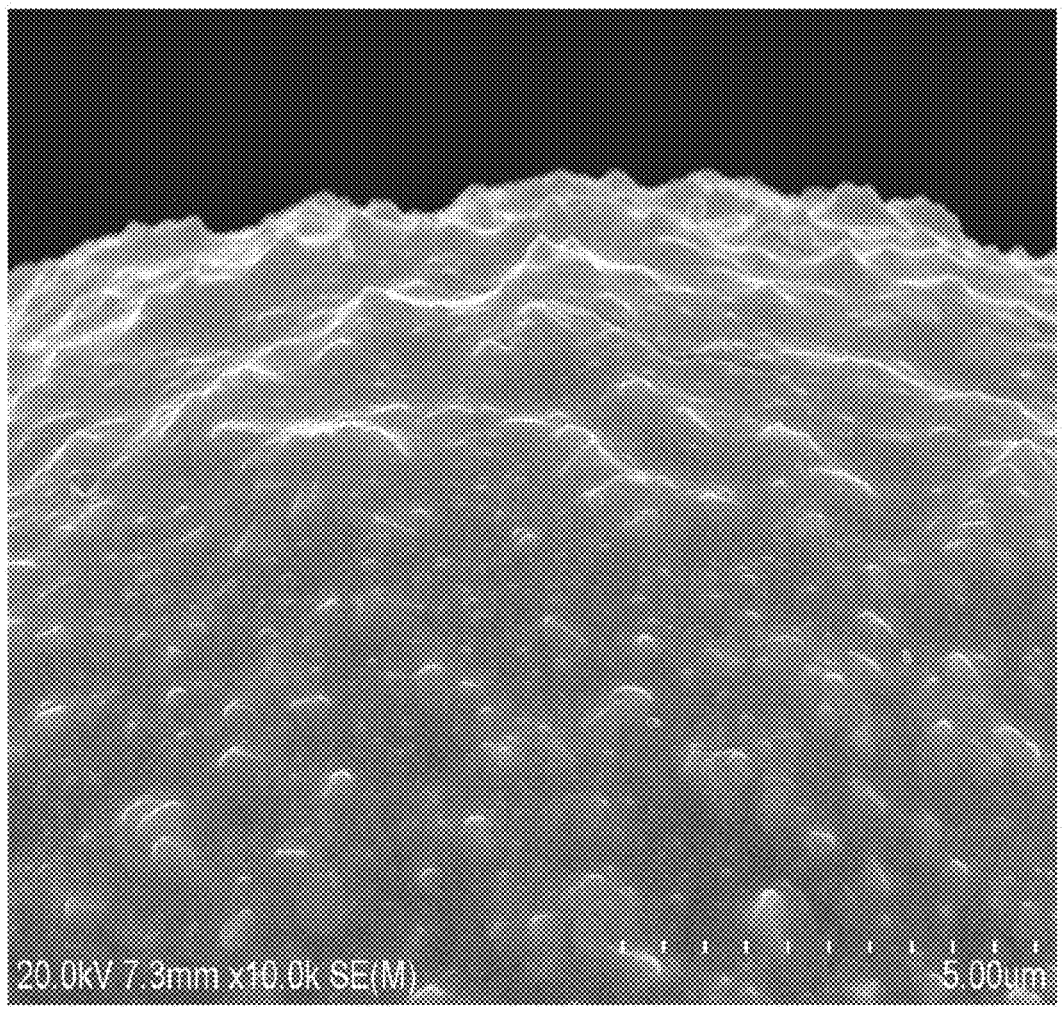
FIG. 5 is an electron micrograph showing the magnetic carrier obtained in Comparative Example 2-1 (magnification: ×10000 times).
Figure 6:
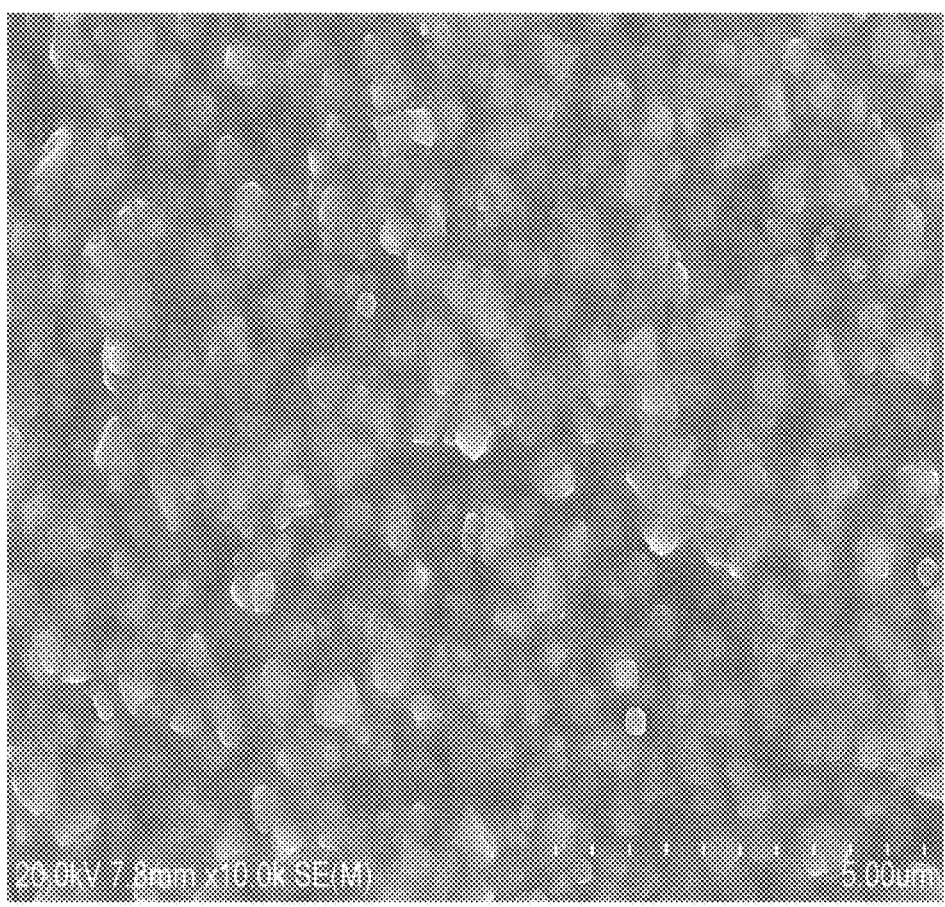
FIG. 6 is an electron micrograph showing the magnetic carrier obtained in Comparative Example 2-1 (magnification: ×10000 times).

Micrographs of surfaces of the thus obtained spherical magnetic composite particles 1 are shown in FIG. 2 to FIG. 4. As shown in FIG. 2 to FIG. 4, irregularities constituted of protrusions owing to the magnetic iron oxide particles onto which a plurality of granules were bonded, and recesses as the other portions than the protrusions were formed on the surface of the respective spherical magnetic composite particles 1.

Examples 2-2 to 2-3 and 2-5 to 2-8 and Comparative Example 2-1 to 2-5 and 2-8

The same procedure as described in Example 2-1 was conducted except that the kinds of magnetic iron oxide particles and the mixing ratio of the particles subjected to the lipophilic treatment, and the production conditions of the spherical magnetic composite particles were changed variously, thereby obtaining spherical magnetic composite particles.

Example 2-4

A flask was charged with the magnetic iron oxide particles C subjected to the lipophilic treatment and the magnetic iron oxide particles M subjected to the lipophilic treatment at a mixing ratio (weight ratio) of 20:80, and the contents of the flask were intimately mixed and stirred at a stirring speed of 250 rpm for 30 min.

Eleven parts by weight of phenol, 16.5 parts by weight of 37% formalin, 100 parts by weight of mixed particles prepared by mixing the magnetic iron oxide particles C and the magnetic iron oxide particles M after both being subjected to lipophilic treatment, 4 parts by weight of a 25% aqueous ammonia and 15 parts by weight of water were charged into a 1 L four-necked flask, and heated to 85° C. over 60 min while stirring at a stirring speed of 250 rpm, and then the contents of the flask were reacted and cured at the same temperature for 120 min, thereby producing spherical magnetic composite particles comprising the magnetic iron oxide particles and the binder resin.

Separately, an acid catalyst comprising 0.3 part by weight of water and 0.5 part by weight of a 99% glacial acetic acid aqueous solution was prepared.

Separately, an aqueous solution comprising 1.5 parts by weight of water, 0.5 part by weight of a melamine powder and 1.3 parts by weight of 37% formalin was heated to about 60° C. while stirring at a stirring speed of 250 rpm for 60 min, and then further stirred for about 40 min, thereby preparing a transparent methylol melamine solution.

Next, while the reaction solution comprising the above produced spherical magnetic composite particles was stirred at a stirring speed of 250 rpm, the above acid catalyst and the above transparent methylol melamine solution were added to the flask maintained at a reaction temperature of 85° C., and the contents of the flask were reacted for 120 min, thereby obtaining spherical magnetic composite particles comprising the above spherical magnetic composite particles on the surface of which a melamine resin coating layer was formed.

Next, the contents of the flask were cooled to 30° C., and then a supernatant liquid was removed therefrom. Further, the resulting precipitate as a lower layer was washed with water and then air-dried. Next, the dried precipitate was dried at 180° C. under reduced pressure (not more than 5 mmHg) to obtain spherical magnetic composite particles 4.

The thus obtained spherical magnetic composite particles 4 were respectively provided on a surface thereof with a thin uniform coating layer comprising the melamine resin, and further with irregularities owing to the magnetic iron oxide particles onto which a plurality of granules were bonded.

Comparative Example 2-6

The same procedure as described in Example 2-1 was conducted except that only one kind of magnetic iron oxide particles were used, and the production conditions of the spherical magnetic composite particles were changed variously, thereby obtaining spherical magnetic composite particles.

Comparative Example 2-7

The same procedure as described in Example 2-1 was conducted except that plate-shaped strontium ferrite (number-average particle diameter: 0.7 μm) was used in place of the magnetic iron oxide particles, and the production conditions of the spherical magnetic composite particles were changed variously, thereby obtaining spherical magnetic composite particles.

Production of Resin-Coated Carrier

Example 2-9

Under a nitrogen flow, a Henschel mixer was charged with 1000 g of the spherical magnetic composite particles 1, 10 g as a solid content of a silicone-based resin (tradename "KR251" produced by Shin-Etsu Chemical Co., Ltd.) and 1.5 g of carbon black (tradename "TOKABLACK #4400" produced by Tokai Carbon Co., Ltd.), and the contents of the Henschel mixer were stirred at 100° C. for 60 min, thereby forming a resin coating layer formed of the silicone-based resin comprising carbon black on the surface of the respective particles.

The thus obtained resin-coated carrier had an average particle diameter of 34 μm, a specific gravity of 3.72 g/cm$^3$, a saturation magnetization value of 77.2 Am$^2$/kg, and an electric resistance value of $8.1 \times 10^8$ Ω·cm as measured upon applying a voltage of 100 V thereto. In addition, as a result of subjecting the resin-coated carrier to a forced deterioration test, it was confirmed that the absolute value of a rate of change in electric resistance value thereof was small.

The silicone-based resin coating layer of the thus obtained resin-coated carrier was observed using a scanning electron microscope ("S-4800" manufactured by Hitachi High-Technologies Corp.). As a result, it was confirmed that the resin coating layer was uniformly and sufficiently formed.

The production conditions of the resulting magnetic iron oxide particles are shown in Table 3, and various properties of the magnetic iron oxide particles are shown in Table 4.

The production conditions of the resulting spherical magnetic composite particles are shown in Table 5, and various properties of the spherical magnetic composite particles are shown in Table 6.

Various properties of the obtained resin-coated carrier and the results of a forced deterioration test of the resin-coated carrier are shown in Table 7.

Examples 2-10 to 2-16 and Comparative Example 2-9 to 2-16

The same procedure as described in Example 2-9 was conducted except that the kind of spherical magnetic composite particles and the production method of the resin-coated carrier were changed variously, thereby obtaining resin-coated carriers.

The silicone-based resin coating layer of the thus obtained resin-coated carrier was observed using a scanning electron microscope ("S-4800" manufactured by Hitachi High-Technologies Corp.). As a result, it was confirmed that the resin coating layer was uniformly and sufficiently formed.

As a result of subjecting the resin-coated carriers obtained Examples 2-10 to 2-16 to a forced deterioration test, it was confirmed that the absolute value of a rate of change in electric resistance value thereof was small. On the other hand, as a result of subjecting the resin-coated carriers obtained Comparative Examples 2-9 to 2-16 to a forced deterioration test, it was confirmed that the absolute value of a rate of change in electric resistance value thereof was large.

TABLE 3

| Iron oxide particles | Iron raw material | | |
|---|---|---|---|
| | Kind | Concentration (mol/L) | Amount (L) |
| Iron oxide particles A | Ferrous sulfate | 1.9 | 10 |
| Iron oxide particles B | Ferrous sulfate | 1.9 | 10 |
| Iron oxide particles C | Ferrous sulfate | 1.9 | 10 |
| Iron oxide particles D | Ferrous sulfate | 1.9 | 10 |
| Iron oxide particles E | Ferrous sulfate | 1.9 | 10 |
| Iron oxide particles F | Ferrous sulfate | 1.9 | 10 |
| Iron oxide particles G | Ferrous sulfate | 1.7 | 21 |
| Iron oxide particles H | Ferrous sulfate | 1.9 | 10 |
| Iron oxide particles I | Ferrous sulfate | 1.9 | 10 |
| Iron oxide particles K | Ferrous sulfate | 1.9 | 10 |

| Iron oxide particles | Alkali raw material | | | |
|---|---|---|---|---|
| | Kind | Concentration (mol/L) | Amount (L) | Equivalent ratio |
| Iron oxide particles A | Sodium hydroxide | 12 | 4 | 1.26 |
| Iron oxide particles B | Sodium hydroxide | 10 | 4 | 1.05 |
| Iron oxide particles C | Sodium hydroxide | 11 | 4 | 1.16 |
| Iron oxide particles D | Sodium hydroxide | 12 | 4 | 1.26 |
| Iron oxide particles E | Sodium hydroxide | 12 | 4 | 1.26 |
| Iron oxide particles F | Sodium hydroxide | 11 | 4.5 | 1.30 |
| Iron oxide particles G | Sodium hydroxide | 18.5 | 4.7 | 1.20 |
| Iron oxide particles H | Sodium hydroxide | 5 | 9 | 1.18 |
| Iron oxide particles I | Sodium hydroxide | 11 | 4 | 1.16 |
| Iron oxide particles K | Sodium hydroxide | 10 | 4 | 1.05 |

| Iron oxide particles | Other elements | | |
|---|---|---|---|
| | Kind | Concentration (mol/L) | Amount (L) |
| Iron oxide particles A | — | — | — |
| Iron oxide particles B | — | — | — |
| Iron oxide particles C | — | — | — |
| Iron oxide particles D | Water glass #3 | 1.0 | 0.1 |
| Iron oxide particles E | Aluminum sulfate | 1.9 | 0.1 |
| Iron oxide particles F | — | — | — |
| Iron oxide particles G | — | — | — |
| Iron oxide particles H | — | — | — |
| Iron oxide particles I | — | — | — |
| Iron oxide particles K | — | — | — |

| Iron oxide particles | Reaction temperature (° C.) | Concentration of iron reacted (mol/L) | Stirring rotating speed (rpm) | Amount of oxygen (L/min) |
|---|---|---|---|---|
| Iron oxide particles A | 95 | 1.36 | 5 | 1.5 |
| Iron oxide particles B | 95 | 1.36 | 5 | 2 |
| Iron oxide particles C | 95 | 1.36 | 5 | 2 |
| Iron oxide particles D | 95 | 1.35 | 5 | 2 |
| Iron oxide particles E | 95 | 1.35 | 5 | 2 |
| Iron oxide particles F | 95 | 1.31 | 5 | 1.5 |
| Iron oxide particles G | 90 | 1.39 | 20 | 20 |
| Iron oxide particles H | 95 | 1.00 | 5 | 1.5 |
| Iron oxide particles I | 95 | 1.36 | 10 | 10 |
| Iron oxide particles K | 95 | 1.22 | 10 | 10 |

TABLE 4

| | Properties of magnetic iron oxide particles | | |
|---|---|---|---|
| Iron oxide particles | Average particle diameter (X) (μm) | Shape | Size of granules (μm) |
| Iron oxide particles A | 3.1 | Plural granules were bonded | 0.3 |
| Iron oxide particles B | 1.4 | Plural granules were bonded | 0.1 |
| Iron oxide particles C | 2.5 | Plural granules were bonded | 0.2 |
| Iron oxide particles D | 2.7 | Plural granules were bonded | 0.2 |
| Iron oxide particles E | 3.0 | Plural granules were bonded | 0.2 |
| Iron oxide particles F | 7.1 | Plural granules were bonded | 0.4 |
| Iron oxide particles G | 0.3 | Octahedral shape | — |
| Iron oxide particles H | 0.2 | Octahedral shape | — |
| Iron oxide particles I | 1.4 | Octahedral shape | — |
| Iron oxide particles J | 0.2 | Spherical shape with angular protrusions | — |

TABLE 4-continued

| Iron oxide particles K | 0.4 | Plural granules were bonded | 0.06 |
| Iron oxide particles L | 0.23 | Spherical shape | — |
| Iron oxide particles M | 0.2 | Spherical shape | — |

| | Properties of magnetic iron oxide particles | | |
|---|---|---|---|
| Iron oxide particles | Shape of granules | BET (Sv) (m²/g) | 2/X |
| Iron oxide particles A | Octahedral shape | 1.5 | 0.6 |
| Iron oxide particles B | Octahedral shape | 6.3 | 1.4 |
| Iron oxide particles C | Octahedral shape | 3.4 | 0.8 |
| Iron oxide particles D | Octahedral shape | 3.5 | 0.7 |
| Iron oxide particles E | Octahedral shape | 2.8 | 0.7 |
| Iron oxide particles F | Octahedral shape | 1.0 | 0.3 |
| Iron oxide particles G | — | 3.1 | 6.7 |
| Iron oxide particles H | — | 3.4 | 10.0 |
| Iron oxide particles I | — | 1.2 | 1.4 |
| Iron oxide particles J | — | 9.2 | 10.0 |
| Iron oxide particles K | Octahedral shape | 4.8 | 5.0 |
| Iron oxide particles L | — | 7.0 | 8.7 |
| Iron oxide particles M | — | 7.2 | 10.0 |

| | Properties of magnetic iron oxide particles | | | |
|---|---|---|---|---|
| Iron oxide particles | Vehicle color L* value | Magnetization value (Am²/kg) | Si content (wt %) | Al content (wt %) |
| Iron oxide particles A | 72.1 | 89.1 | — | — |
| Iron oxide particles B | 62.1 | 87.4 | — | — |
| Iron oxide particles C | 65.4 | 87.7 | — | — |
| Iron oxide particles D | 68.7 | 86.5 | 0.2 | — |
| Iron oxide particles E | 70.8 | 84.4 | — | 0.3 |
| Iron oxide particles F | 75.3 | 89.9 | — | — |
| Iron oxide particles G | 55.0 | 87.9 | — | — |
| Iron oxide particles H | 53.4 | 87.1 | — | — |
| Iron oxide particles I | 59.8 | 89.0 | — | — |
| Iron oxide particles J | 40.5 | 87.5 | 0.5 | — |
| Iron oxide particles K | 58.7 | 86.1 | — | — |
| Iron oxide particles L | 38.0 | 84.4 | — | — |
| Iron oxide particles M | 37.8 | 84.3 | — | — |

TABLE 5

| | Magnetic iron oxide particles (a) | | |
|---|---|---|---|
| | | Lipophilic treatment agent | |
| Examples and Comp. Examples | Kind | Kind | Amount based on iron oxide particles (%) |
| Example 2-1 | Iron oxide particles A | KBM403 | 0.5 |
| Example 2-2 | Iron oxide particles A | KBM403 | 0.5 |
| Example 2-3 | Iron oxide particles B | KBM403 | 0.5 |
| Example 2-4 | Iron oxide particles C | KBM403 | 0.5 |
| Example 2-5 | Iron oxide particles C | KBM403 | 0.5 |
| Example 2-6 | Iron oxide particles D | KBM403 | 0.5 |
| Example 2-7 | Iron oxide particles E | KBM403 | 0.5 |
| Example 2-8 | Iron oxide particles F | KBM403 | 0.5 |
| Comp. Example 2-1 | Iron oxide particles G | KBM403 | 0.5 |
| Comp. Example 2-2 | Iron oxide particles H | KBM403 | 0.5 |
| Comp. Example 2-3 | Iron oxide particles I | KBM403 | 0.5 |
| Comp. Example 2-4 | Iron oxide particles J | KBM403 | 0.5 |
| Comp. Example 2-5 | Iron oxide particles K | KBM403 | 0.5 |
| Comp. Example 2-6 | Iron oxide particles M | KBM403 | 1.0 |
| Comp. Example 2-7 | Sr ferrite | KBM403 | 0.6 |
| Comp. Example 2-8 | Iron oxide particles L | KBM403 | 0.5 |

| | Magnetic iron oxide particles (b) | | |
|---|---|---|---|
| | | Lipophilic treatment agent | |
| Examples and Comp. Examples | Kind | Kind | Amount based on iron oxide particles (%) |
| Example 2-1 | Iron oxide particles M | KBM403 | 1.0 |
| Example 2-2 | Iron oxide particles M | KBM403 | 1.0 |
| Example 2-3 | Iron oxide particles M | KBM403 | 1.0 |
| Example 2-4 | Iron oxide particles M | KBM403 | 1.0 |
| Example 2-5 | Iron oxide particles M | KBM403 | 1.0 |
| Example 2-6 | Iron oxide particles M | KBM403 | 1.0 |
| Example 2-7 | Iron oxide particles M | KBM403 | 1.0 |
| Example 2-8 | Iron oxide particles M | KBM403 | 1.0 |
| Comp. Example 2-1 | Iron oxide particles M | KBM403 | 1.0 |
| Comp. Example 2-2 | Iron oxide particles M | KBM403 | 1.0 |
| Comp. Example 2-3 | Iron oxide particles M | KBM403 | 1.0 |
| Comp. Example 2-4 | Iron oxide particles M | KBM403 | 1.0 |
| Comp. Example 2-5 | Iron oxide particles M | KBM403 | 1.0 |
| Comp. Example 2-6 | *Produced from iron oxide particles M only | | |
| Comp. Example 2-7 | Iron oxide particles M | KBM403 | 1.1 |

TABLE 5-continued

| Examples and Comp. Examples | | | | |
|---|---|---|---|---|
| Comp. Example 2-8 | Iron oxide particles M | KBM403 | 1.0 | |

| Examples and Comp. Examples | Weight ratio (a/b) | Particle diameter ratio (ra/rb) | Basic catalyst Kind | Amount (weight part(s)) |
|---|---|---|---|---|
| Example 2-1 | 30/70 | 15.5 | Aqueous ammonia | 3.5 |
| Example 2-2 | 10/90 | 15.5 | Aqueous ammonia | 4.2 |
| Example 2-3 | 45/55 | 7.0 | Aqueous ammonia | 3.2 |
| Example 2-4 | 20/80 | 12.5 | Aqueous ammonia | 4.0 |
| Example 2-5 | 40/60 | 12.5 | Aqueous ammonia | 3.3 |
| Example 2-6 | 30/70 | 13.5 | Aqueous ammonia | 3.5 |
| Example 2-7 | 20/80 | 15.0 | Aqueous ammonia | 4.0 |
| Example 2-8 | 25/75 | 35.5 | Aqueous ammonia | 4.1 |
| Comp. Example 2-1 | 30/70 | 1.5 | Aqueous ammonia | 3.5 |
| Comp. Example 2-2 | 40/60 | 1.0 | Aqueous ammonia | 3.3 |
| Comp. Example 2-3 | 20/80 | 7.0 | Aqueous ammonia | 4.0 |
| Comp. Example 2-4 | 30/70 | 1.0 | Aqueous ammonia | 3.5 |
| Comp. Example 2-5 | 30/70 | 2.0 | Aqueous ammonia | 3.5 |
| Comp. Example 2-6 | *Produced from iron oxide particles M only | | Aqueous ammonia | 4.6 |
| Comp. Example 2-7 | 20/80 | 3.5 | Aqueous ammonia | 3.5 |
| Comp. Example 2-8 | 30/70 | 1.2 | Aqueous ammonia | 3.5 |

| Examples and Comp. Examples | Binder resin Kind | Amount (weight part(s)) | Aldehyde compound Kind | Amount (weight part(s)) |
|---|---|---|---|---|
| Example 2-1 | Phenol | 10.0 | Formalin | 15.0 |
| Example 2-2 | Phenol | 12.0 | Formalin | 18.0 |
| Example 2-3 | Phenol | 8.5 | Formalin | 13.0 |
| Example 2-4 | Phenol | 11.0 | Formalin | 16.5 |
| Example 2-5 | Phenol | 9.0 | Formalin | 13.5 |
| Example 2-6 | Phenol | 10.0 | Formalin | 15.0 |
| Example 2-7 | Phenol | 11.0 | Formalin | 16.5 |
| Example 2-8 | Phenol | 11.5 | Formalin | 17.0 |
| Comp. Example 2-1 | Phenol | 10.0 | Formalin | 15.0 |
| Comp. Example 2-2 | Phenol | 9.0 | Formalin | 13.5 |
| Comp. Example 2-3 | Phenol | 11.0 | Formalin | 16.5 |
| Comp. Example 2-4 | Phenol | 10.0 | Formalin | 15.0 |
| Comp. Example 2-5 | Phenol | 10.0 | Formalin | 15.0 |
| Comp. Example 2-6 | Phenol | 13.0 | Formalin | 19.5 |
| Comp. Example 2-7 | Phenol | 11.3 | Formalin | 15.0 |
| Comp. Example 2-8 | Phenol | 10.0 | Formalin | 15.0 |

| Examples and Comp. Examples | Water Amount (weight part(s)) | Melamine Amount (weight part(s)) |
|---|---|---|
| Example 2-1 | 15.0 | — |
| Example 2-2 | 15.0 | — |
| Example 2-3 | 15.0 | — |
| Example 2-4 | 15.0 | 0.5 |
| Example 2-5 | 15.0 | — |
| Example 2-6 | 15.0 | — |
| Example 2-7 | 15.0 | — |
| Example 2-8 | 15.0 | — |
| Comp. Example 2-1 | 15.0 | — |
| Comp. Example 2-2 | 15.0 | — |
| Comp. Example 2-3 | 15.0 | — |
| Comp. Example 2-4 | 15.0 | — |
| Comp. Example 2-5 | 15.0 | — |
| Comp. Example 2-6 | 15.0 | — |
| Comp. Example 2-7 | 12.8 | — |
| Comp. Example 2-8 | 15.0 | — |

TABLE 6

| Examples and Comp. Examples | Properties of magnetic carrier | | | |
|---|---|---|---|---|
| | Average particle diameter (μm) | Shape | Specific gravity (g/cm$^3$) | Saturation magnetization (Am$^2$/kg) |
| Example 2-1 | 32 | Spherical shape | 3.76 | 76.5 |
| Example 2-2 | 35 | Spherical shape | 3.67 | 73.6 |
| Example 2-3 | 32 | Spherical shape | 3.80 | 77.9 |
| Example 2-4 | 36 | Spherical shape | 3.71 | 74.8 |
| Example 2-5 | 34 | Spherical shape | 3.76 | 77.4 |
| Example 2-6 | 35 | Spherical shape | 3.74 | 75.8 |
| Example 2-7 | 33 | Spherical shape | 3.72 | 74.3 |
| Example 2-8 | 32 | Spherical shape | 3.75 | 75.1 |
| Comp. Example 2-1 | 37 | Spherical shape | 3.82 | 75.4 |
| Comp. Example 2-2 | 35 | Spherical shape | 3.72 | 77.1 |
| Comp. Example 2-3 | 36 | Spherical shape | 3.79 | 75.1 |
| Comp. Example 2-4 | 34 | Spherical shape | 3.82 | 76.0 |
| Comp. Example 2-5 | 33 | Spherical shape | 3.77 | 75.7 |
| Comp. Example 2-6 | 36 | Spherical shape | 3.72 | 72.4 |
| Comp. Example 2-7 | 35 | Spherical shape | 3.76 | 68.5 |
| Comp. Example 2-8 | 33 | Spherical shape | 3.76 | 75.2 |

TABLE 7

| Examples and Comp. Examples | Core particles Kind | Coating resin Kind | Amount based on core material (%) |
|---|---|---|---|
| Example 2-9 | Example 2-1 | Silicone-based resin | 1.0 |

TABLE 7-continued

| Examples and Comp. Examples | | | |
|---|---|---|---|
| Example 2-10 | Example 2-2 | Silicone-based resin | 1.5 |
| Example 2-11 | Example 2-3 | Styrene-acrylic resin | 1.0 |
| Example 2-12 | Example 2-4 | Silicone-based resin | 1.0 |
| Example 2-13 | Example 2-5 | Silicone-based resin | 1.5 |
| Example 2-14 | Example 2-6 | Silicone-based resin | 1.0 |
| Example 2-15 | Example 2-7 | Silicone-based resin | 0.8 |
| Example 2-16 | Example 2-8 | Silicone-based resin | 1.0 |
| Comp. Example 2-9 | Comp. Example 2-1 | Silicone-based resin | 1.0 |
| Comp. Example 2-10 | Comp. Example 2-2 | Silicone-based resin | 1.0 |
| Comp. Example 2-11 | Comp. Example 2-3 | Silicone-based resin | 1.0 |
| Comp. Example 2-12 | Comp. Example 2-4 | Silicone-based resin | 1.0 |
| Comp. Example 2-13 | Comp. Example 2-5 | Silicone-based resin | 1.0 |
| Comp. Example 2-14 | Comp. Example 2-6 | Silicone-based resin | 1.0 |
| Comp. Example 2-15 | Comp. Example 2-7 | Silicone-based resin | 1.0 |
| Comp. Example 2-16 | Comp. Example 2-8 | Silicone-based resin | 1.0 |

| Examples and Comp. Examples | Additives | | Properties of magnetic carrier with resin coating layer | |
|---|---|---|---|---|
| | Kind | Amount based on core material (%) | Average particle diameter (μm) | Specific gravity (g/cm$^3$) |
| Example 2-9 | Carbon black | 0.15 | 34 | 3.72 |
| Example 2-10 | Carbon black | 0.15 | 37 | 3.63 |
| Example 2-11 | Carbon black | 0.15 | 34 | 3.76 |
| Example 2-12 | Carbon black | 0.15 | 38 | 3.67 |
| Example 2-13 | Carbon black | 0.15 | 36 | 3.72 |
| Example 2-14 | Carbon black | 0.15 | 37 | 3.70 |
| Example 2-15 | Carbon black | 0.15 | 35 | 3.68 |
| Example 2-16 | Carbon black | 0.15 | 34 | 3.71 |
| Comp. Example 2-9 | Carbon black | 0.15 | 39 | 3.69 |
| Comp. Example 2-10 | Carbon black | 0.15 | 37 | 3.68 |
| Comp. Example 2-11 | Carbon black | 0.15 | 38 | 3.75 |
| Comp. Example 2-12 | Carbon black | 0.15 | 36 | 3.78 |
| Comp. Example 2-13 | Carbon black | 0.15 | 35 | 3.73 |
| Comp. Example 2-14 | Carbon black | 0.15 | 38 | 3.68 |
| Comp. Example 2-15 | Carbon black | 0.15 | 37 | 3.72 |
| Comp. Example 2-16 | Carbon black | 0.15 | 35 | 3.72 |

| Examples and Comp. Examples | Properties of magnetic carrier with resin coating layer | | Forced deterioration test |
|---|---|---|---|
| | Saturation magnetization (Am$^2$/kg) | Electric resistance value when applying 100 V (Ω·cm) | Rate of change in electric resistance value |
| Ex. 2-9 | 77.2 | 8.1E+08 | A |
| Ex. 2-10 | 75.2 | 8.5E+13 | A |
| Ex. 2-11 | 77.1 | 4.3E+09 | A |
| Ex. 2-12 | 74.1 | 1.2E+09 | A |
| Ex. 2-13 | 76.6 | 7.8E+13 | A |
| Ex. 2-14 | 75.0 | 3.5E+09 | A |
| Ex. 2-15 | 73.6 | 2.3E+09 | A |
| Ex. 2-16 | 74.4 | 6.0E+08 | A |
| Comp. Ex. 2-9 | 72.9 | 7.2E+12 | D |
| Comp. Ex. 2-10 | 74.0 | 6.4E+12 | D |
| Comp. Ex. 2-11 | 75.7 | 2.2E+13 | C |
| Comp. Ex. 2-12 | 75.3 | 3.8E+13 | D |
| Comp. Ex. 2-13 | 74.9 | 1.5E+10 | C |
| Comp. Ex. 2-14 | 71.7 | 1.2E+14 | C |
| Comp. Ex. 2-15 | 67.8 | 2.3E+13 | C |
| Comp. Ex. 2-16 | 74.5 | 9.8E+12 | C |

From the evaluation results of the forced deterioration test as shown in Table 7, since the magnetic carriers and the developers according to the present invention were excellent in adhesion between the magnetic composite particles and the coating resins, it was possible to enhance a durability of the resin coating layer. More specifically, since the electric resistance value of the magnetic carrier can be maintained over a long period of time, it was confirmed that the magnetic carrier according to the present invention had a good durability and was capable of maintaining formation of high-quality images for a long period of time.

INDUSTRIAL APPLICABILITY

The magnetic iron oxide particles according to the present invention have such a shape that a plurality of granules are bonded thereto and an adequate particle diameter, and therefore can be prevented from being desorbed from the resin carrier. For this reason, since no deterioration in developability owing to the desorbed magnetic iron oxide particles occurs, the magnetic iron oxide particles of the present invention are optimum as magnetic iron oxide particles for a resin carrier. In addition, when using the magnetic iron oxide particles for a brake friction material, the resulting material exhibits a sufficiently stable friction coefficient and can suitably reduce brake noise. Further, when using the magnetic iron oxide particles for cosmetics, it is possible to suitably produce cosmetics that are excellent in coatability, retention property and cleaning property.

Also, the magnetic carrier according to the present invention is provided on the surface thereof with irregularities owing to the magnetic iron oxide particles onto which a plurality of granules are bonded. Therefore, the magnetic carrier is excellent in adhesion between the magnetic composite particles and the coating resin and therefore can maintain an electric resistance value over a long period of time. Accordingly, the magnetic carrier according to the present invention is capable of satisfying the requirement of a high reliability that has been required with the increase in image quality and copying or printing speed, and therefore can be suitably used as a magnetic carrier for electrophotographic developers and as a two-component system developer comprising the magnetic carrier for electrophotographic developers and a toner.

The invention claimed is:

1. Magnetic iron oxide particles comprising a plurality of magnetic iron oxide granules bonded to each other to form the magnetic iron oxide particles, the magnetic iron oxide particles having an average particle diameter of 1.0 to 20 µm, wherein the magnetic iron oxide particles have a specific surface area Sv ($m^2/g$) capable of satisfying the relation represented by the following formula:

Sv≥2/X wherein X is an average particle diameter (µm) the magnetic iron oxide particles, wherein a numerical value of Sv expressed in units of $m^2/g$ is greater than or equal to a numerical value of two divided by X expressed in units of µm.

2. The magnetic iron oxide particles according to claim 1, wherein the magnetic iron oxide particles have a vehicle color L* value of not less than 60.

3. The magnetic iron oxide particles according to claim 1 comprising magnetite particles having a formula of $(FeO)_x \cdot Fe_2O_3$, where $0 < x \leq 1$.

4. A magnetic carrier for electrophotographic developers comprising spherical magnetic composite particles produced by dispersing (a) granule-bonded magnetic iron oxide particles comprising the magnetic iron oxide particles as claimed in claim 1 in a binder resin.

5. The magnetic carrier for electrophotographic developers according to claim 4, wherein the spherical magnetic composite particles are produced by dispersing (a) the granule-bonded particles comprising the magnetic iron oxide particles and (b) granule-non-bonded magnetic iron oxide granules that are not bonded to each other, and wherein a mixing ratio between (a) the granule-bonded magnetic iron oxide particles that are bonded to each other and (b) the granule-non-bonded magnetic iron oxide granules that are not bonded to each other is controlled such that the granule-bonded magnetic iron oxide particles (a) are contained in an amount of 5 to 95% by weight based on 100% by weight as a total weight of the (a) granule-bonded particles comprising the magnetic iron oxide particles and (b) granule-non-bonded magnetic iron oxide granules in the magnetic carrier.

6. The magnetic carrier for electrophotographic developers according to claim 4, wherein the binder resin is a phenol-based resin.

7. The magnetic carrier for electrophotographic developers according to claim 4, wherein a surface of the respective spherical magnetic composite particles is coated with a coating layer comprising a melamine resin.

8. The magnetic carrier for electrophotographic developers according to claim 4, wherein a surface of the respective spherical magnetic composite particles is coated with a resin, and the coating resin is at least one resin selected from the group consisting of a silicone-based resin, a fluorine-based resin, an acrylic resin and a styrene-acrylic resin.

9. A two-component system developer comprising the magnetic carrier for electrophotographic developers as claimed in claim 4 and a toner.

10. Magnetic iron oxide particles comprising a plurality of magnetic iron oxide granules bonded to each other to form the magnetic iron oxide particles, wherein the magnetic iron oxide granules have an average particle diameter of 0.02 to 2.0 µm, and wherein the magnetic iron oxide particles have a specific surface area Sv ($m^2/g$) capable of satisfying the relation represented by the following formula:

Sv≥2/X wherein X is an average particle diameter (µm) the magnetic iron oxide particles, such that a numerical value of Sv expressed in units of $m^2/g$ is greater than or equal to a numerical value of two divided by X expressed in units of µm.

* * * * *